(12) United States Patent
Anderson et al.

(10) Patent No.: US 12,345,924 B2
(45) Date of Patent: Jul. 1, 2025

(54) SYSTEMS AND METHODS FOR OPTICAL FIBER ALIGNMENT

(71) Applicant: INTUITIVE SURGICAL OPERATIONS, INC., Sunnyvale, CA (US)

(72) Inventors: Tor C. Anderson, Los Gatos, CA (US); Matthew R. Cavalier, Los Gatos, CA (US)

(73) Assignee: INTUITIVE SURGICAL OPERATIONS, INC., Sunnyvale, CA (US)

( * ) Notice: Subject to any disclaimer, the term of this patent is extended or adjusted under 35 U.S.C. 154(b) by 340 days.

(21) Appl. No.: 17/887,639

(22) Filed: Aug. 15, 2022

(65) Prior Publication Data
US 2023/0059738 A1  Feb. 23, 2023

Related U.S. Application Data
(60) Provisional application No. 63/234,565, filed on Aug. 18, 2021.

(51) Int. Cl.
*G02B 6/38* (2006.01)
*B08B 1/14* (2024.01)
(Continued)

(52) U.S. Cl.
CPC ............ *G02B 6/3838* (2013.01); *B08B 1/143* (2024.01); *B08B 1/30* (2024.01); *G02B 6/3652* (2013.01);
(Continued)

(58) Field of Classification Search
CPC .. G02B 6/3825; G02B 6/3881; G02B 6/3866; G02B 6/3874; G02B 6/3885; G02B 6/3807; G02B 6/389; G02B 6/3821
See application file for complete search history.

(56) References Cited

U.S. PATENT DOCUMENTS

| | | | | |
|---|---|---|---|---|
| 4,019,806 A | * | 4/1977 | Fellows | G02B 6/3843 385/67 |
| 4,113,346 A | * | 9/1978 | Jackson | G02B 6/3636 385/84 |

(Continued)

FOREIGN PATENT DOCUMENTS

| | | | |
|---|---|---|---|
| EP | 0043422 A1 | * | 1/1982 |
| EP | 0262631 A2 | * | 4/1988 |

(Continued)

OTHER PUBLICATIONS

Müller et al., Machine Translation of EP 0262631 A2, Apr. 6, 1988. (Year: 1988).*
(Continued)

*Primary Examiner* — Michelle R Connelly
(74) *Attorney, Agent, or Firm* — Haynes & Boone, LLP.

(57) ABSTRACT

An optical fiber alignment assembly may comprise an alignment fixture including a groove configured to engage first and second optical fiber ferrules, a first clamping mechanism configured to selectively apply a force on the first optical fiber ferrule to constrain motion of the first optical fiber ferrule within the groove, and a second clamping mechanism configured to selectively apply a force on the second optical fiber ferrule to constrain motion of the second optical fiber ferrule within the groove.

25 Claims, 19 Drawing Sheets

(51) Int. Cl.
*B08B 1/30* (2024.01)
*G02B 6/36* (2006.01)

(52) U.S. Cl.
CPC .......... *G02B 6/3806* (2013.01); *G02B 6/381* (2013.01); *G02B 6/3825* (2013.01); *G02B 6/3858* (2013.01); *G02B 6/3866* (2013.01); *G02B 6/3881* (2013.01); *B08B 2240/02* (2013.01)

(56) References Cited

U.S. PATENT DOCUMENTS

| | | | |
|---|---|---|---|
| 6,389,187 | B1 | 5/2002 | Greenaway et al. |
| 7,772,541 | B2 | 8/2010 | Froggatt et al. |
| 7,781,724 | B2 | 8/2010 | Childers et al. |
| 8,900,131 | B2 | 12/2014 | Chopra et al. |
| 2014/0219619 | A1* | 8/2014 | Hui ............... G02B 6/3825 385/134 |
| 2019/0029770 | A1 | 1/2019 | Bailey |
| 2021/0278604 | A1* | 9/2021 | Rohr Daniel ......... B08B 1/34 |
| 2023/0221499 | A1* | 7/2023 | Hashimoto ......... G02B 6/3866 15/103.5 |

FOREIGN PATENT DOCUMENTS

| | | | | |
|---|---|---|---|---|
| GB | 1571942 | A | * 7/1980 | ......... G02B 6/3869 |
| JP | 2003200116 | A | * 7/2003 | |
| WO | WO-2016191298 | A1 | 12/2016 | |
| WO | WO-2018132386 | A1 | 7/2018 | |
| WO | WO-2019018736 | A2 | 1/2019 | |
| WO | WO-2019027922 | A1 | 2/2019 | |

OTHER PUBLICATIONS

Fujiwara et al., Machine Translation of JP 2003-200116 A, Jul. 15, 2003. (Year: 2003).*
Schmidt, Bernhard, Machine Translation of EP 0 043 422 A1, Jan. 13, 1982. (Year: 1982).*
Vertut, J, and Coiffet, P., "Robot Technology: Teleoperation and Robotics Evolution and Development," English translation, Prentice-Hall, Inc., Inglewood Cliffs, NJ, USA 1986, vol. 3A, 332 pages.

* cited by examiner

SYSTEMS AND METHODS FOR OPTICAL FIBER ALIGNMENT

CROSS-REFERENCED APPLICATIONS

This application claims priority to and the benefit of U.S. Provisional Application No. 63/234,565, filed Aug. 18, 2021 and entitled "Systems and Methods for Optical Fiber Alignment," which is incorporated by reference herein in its entirety.

FIELD

Examples described herein relate to systems and methods for cleaning and/or aligning end portion(s) of optical fiber(s) terminating in ferrule(s).

BACKGROUND

Optical fibers may be connected to each other to allow light to travel from one fiber to another. The optical fibers may be connected in an end-to-end manner, with a face of a first optical fiber in contact with a face of a second optical fiber. To facilitate connection of the optical fibers, each optical fiber may terminate within a ferrule. The ferrules may be mechanically coupled by a connection assembly to align the cores of the optical fibers so that light can pass from the first optical fiber to the second optical fiber. Prior to making an optical fiber connection, the face of both optical fibers are thoroughly cleaned in order to remove any particulate matter present on the face of the optical fibers. Particulate matter such as airborne dust particles, skin oils, lint, and fabric, among other dirt or debris may affect the signals transmitted through the optical fibers. If an optical fiber interface is contaminated with particulate matter, the particulate matter may also scratch the fiber face or may become embedded within the fiber face over time. Damage to the optical fibers may require repair or replacement of one or both of the optical fibers, which can be expensive and inconvenient. Systems and methods are needed that allow for cleaning of the optical fiber(s) while the optical fiber ferrule(s) are located within the connection assembly to minimize the opportunity for debris to contaminate the interface between optical fibers.

SUMMARY

The following presents a simplified summary of various examples described herein and is not intended to identify key or critical elements or to delineate the scope of the claims. In some examples, an optical fiber alignment assembly may comprise an alignment fixture including a groove configured to engage first and second optical fiber ferrules, a first clamping mechanism configured to selectively apply a force on the first optical fiber ferrule to constrain motion of the first optical fiber ferrule within the groove, and a second clamping mechanism configured to selectively apply a force on the second optical fiber ferrule to constrain motion of the second optical fiber ferrule within the groove.

In another example, a medical system may comprise a medical instrument in which a first optical fiber extends. A first ferrule may be coupled to an end of the first optical fiber. The medical system may also comprise an instrument manipulator in which a second optical fiber extends. A second ferrule may be coupled to an end of the second optical fiber. The medical system may also comprise an optical fiber alignment assembly including an alignment fixture including a groove configured to engage the first and second ferrules, a first clamping mechanism configured to selectively apply a force on the first ferrule to constrain motion of the first ferrule within the groove, and a second clamping mechanism configured to selectively apply a force on the second ferrule to constrain motion of the second ferrule within the groove.

It is to be understood that both the foregoing general description and the following detailed description are illustrative and explanatory in nature and are intended to provide an understanding of the present disclosure without limiting the scope of the present disclosure. In that regard, additional aspects, features, and advantages of the present disclosure will be apparent to one skilled in the art from the following detailed description.

BRIEF DESCRIPTIONS OF THE DRAWINGS

Figure 1:
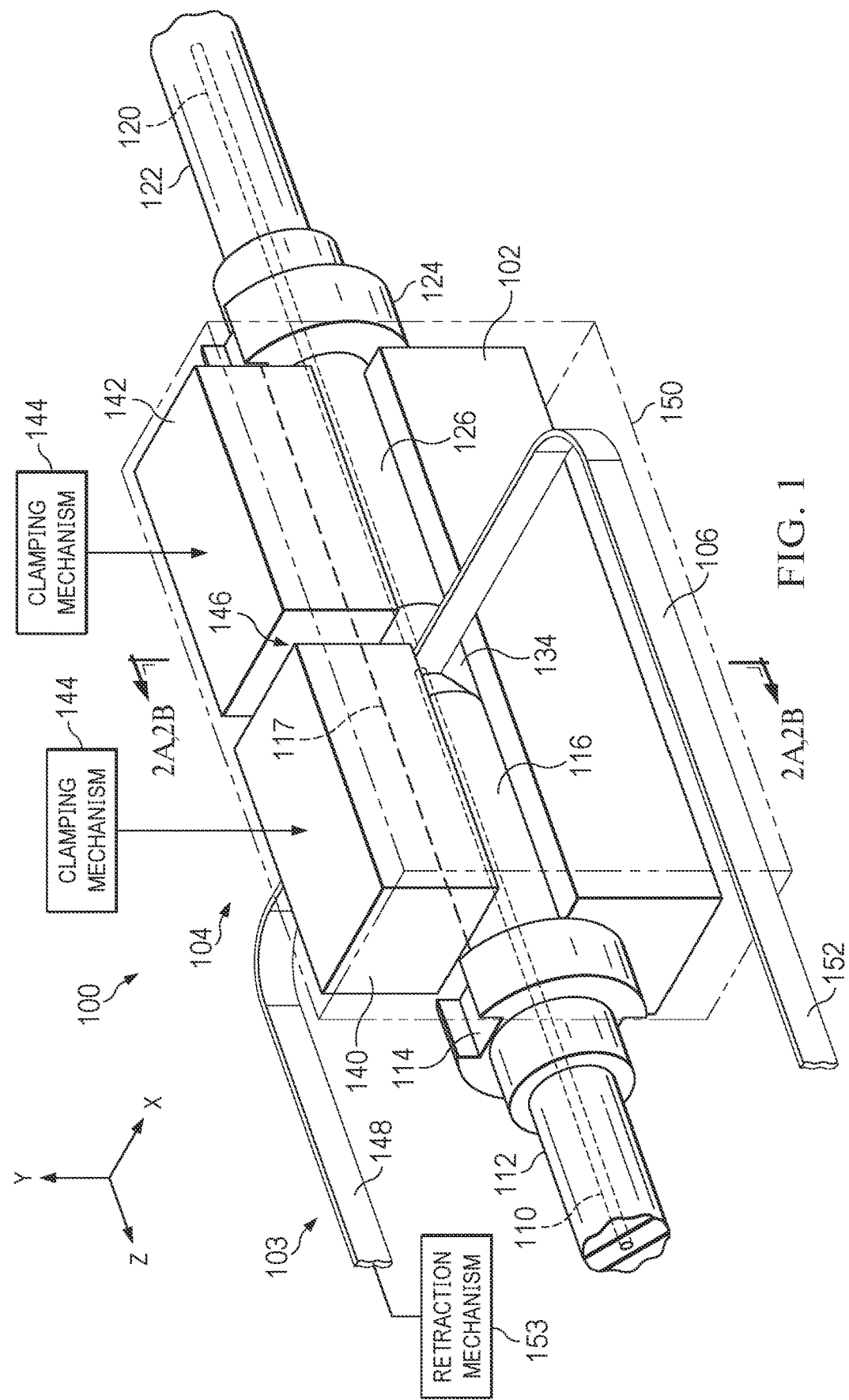
FIG. 1 illustrates a perspective view of an optical fiber alignment assembly according to some examples.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The technology described herein provides an optical fiber alignment assembly for coupling and aligning a pair of optical fiber ferrules in which optical fibers are terminated. In some examples, the optical fiber alignment assembly may be used with a cleaning assembly for cleaning the end portions of the optical fibers while the optical fiber ferrules are coupled to the optical fiber alignment assembly. In some examples, the optical fiber alignment assembly may be used to align and couple an optical fiber in a medical instrument with an optical fiber in the medical instrument manipulator. For example, the medical use of optical fibers may include optical fibers used in a fiber optical shape sensing system (e.g., used to determine the position, orientation, speed, velocity, pose, and/or shape of a distal portion and/or of one or more segments along a medical instrument), fiber optical strain sensing for use in a medical instrument force sensor, fiber optic diagnosis and treatment based on spectroscopic bio-chemical sensing, and/or fiber optic delivery of laser tissue ablation, among other uses. U.S. patent application Ser. No. 17/193,166, filed Mar. 5, 2021 and titled "Systems and Methods for Optical Fiber Cleaning and Interface Particle Reduction," discloses systems, assemblies, and techniques for optical fiber alignment, connection, and cleaning and is incorporated by reference herein in its entirety.

FIG. 1 illustrates a perspective view of an optical fiber alignment assembly 100 within an environment with a frame of reference (X, Y, Z) according to some examples. The optical fiber alignment assembly 100 may include an alignment fixture 102, a clamping assembly 104, and, optionally, a cleaning assembly 103 which may include a cleaning media 106. The optical fiber alignment assembly 100 may be used to couple an optical fiber 110 and an optical fiber 120. Optionally, the optical fiber alignment assembly 100 may include a housing 150 that houses the alignment fixture 102, the clamping assembly 104, and at least a portion of the cleaning media 106.

The optical fiber 110 may extend within an optical fiber cable 112. A flange 114 at the distal end of the optical fiber cable 112 may couple the cable 112 to an optical fiber ferrule 116. The optical fiber 110 may extend through the optical fiber ferrule 116. The optical fiber 110 may terminate at a distal surface 118 of the optical fiber ferrule 116. The optical fiber 120 may extend within an optical fiber cable 122. A flange 124 at the distal end of the optical fiber cable 122 may couple the cable 122 to an optical fiber ferrule 126. The optical fiber 120 may extend through the optical fiber ferrule 126. The optical fiber 120 may terminate at a distal surface (not shown) of the optical fiber ferrule 126. In some examples, the flange 114 and the flange 124 may include flat surface that may engage the clamping mechanisms and/or the alignment fixture 102 to prevent the flanges and the coupled ferrules from rolling relative to the clamping mechanisms and alignment fixture.

The alignment fixture 102 may be a rigid substrate formed of one or more materials such as glass, ceramic, metal, and/or silicon wafer. As shown in greater detail in FIGS. 2A and 2B, the alignment fixture 102 includes an alignment feature including a generally planar engagement surface 130 and a generally planar engagement surface 132 that intersect to form a v-shaped groove 134. The optical fiber ferrules 116, 126 may be received in the groove 134 and held in place against the surfaces 130, 132 by the clamping assembly 104. In some examples, the engagement surface 130 and the engagement surface 132 may form an angle between approximately 60 and 120 degrees.

Figure 2A:
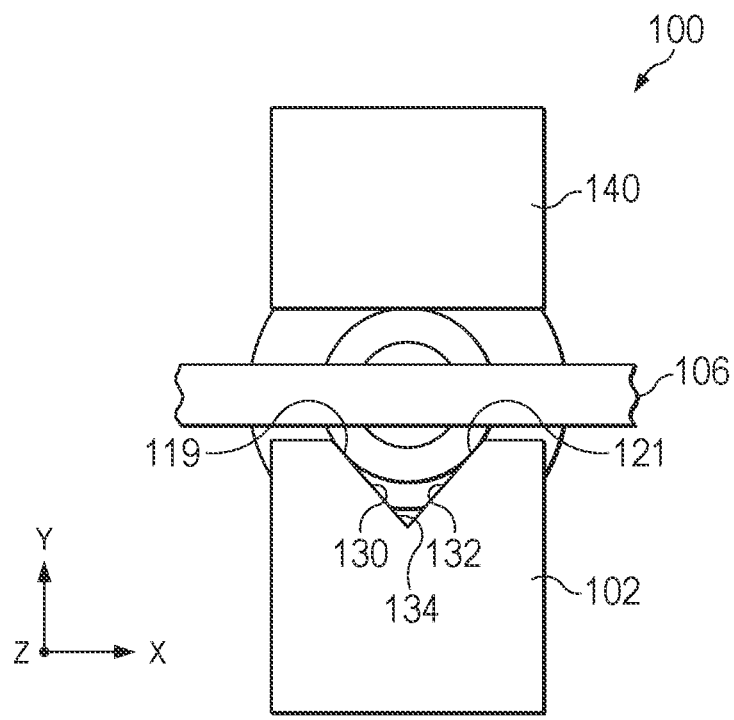
FIG. 2A illustrates a cross-sectional view through the optical fiber alignment assembly of FIG. 1 with cleaning media in a cleaning position, according to some examples.
Figure 2B:
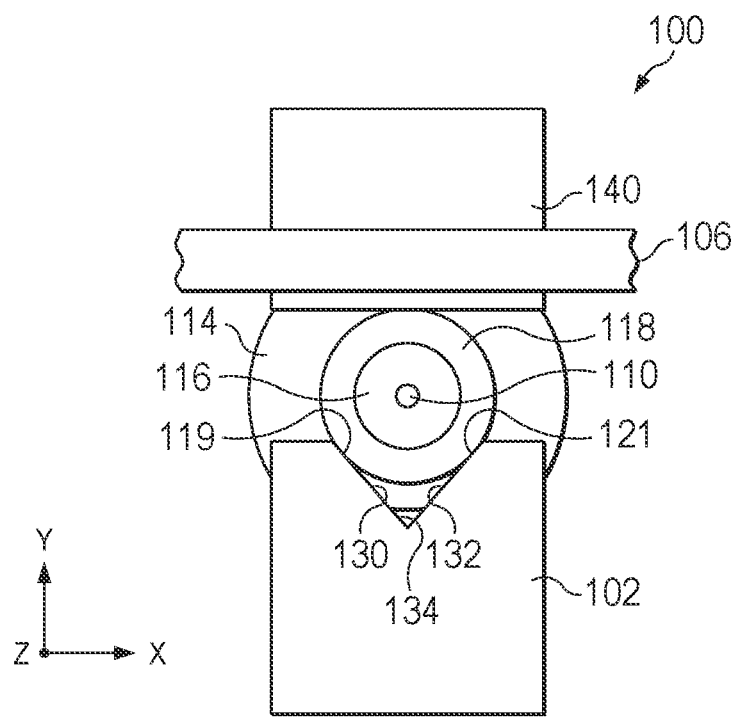
FIG. 2B illustrates a cross-sectional view through the optical fiber alignment assembly of FIG. 1 with cleaning media in a retracted position, according to some examples.

The clamping assembly 104 may include a clamping member 140, a clamping member 142, and a clamping mechanism 144. The clamping mechanism 144 may include a spring, a threaded device, an electromechanical actuator, or any other kind of mechanical, pneumatic, or electrically activated actuator which may apply a force F1 to the clamping members 140, 142. The force F1 applied by the clamping members 140, 142 may hold the ferrules 116, 126 against the surfaces 130, 132 to constrain the motion of the ferrules 116, 126. The optical fiber ferrules 116, 126 may be generally cylindrical such that when they are constrained by the clamping members 140, 142, the ferrule 116 may make a generally linear contact 117 with the clamping member 140, a generally linear contact 119 (e.g., perpendicular to the page as shown in FIGS. 2A and 2B) with the surface 130 and a generally linear contact 121 (e.g., perpendicular to the page as shown in FIGS. 2A and 2B) with the surface 132. A linear contact may refer to the area of generally linear interface between the curved surface of the ferrule and the flat surface of the clamping mechanism or alignment fixture. Similarly, the ferrule 126 may make a generally linear contact with the clamping member 142, a generally linear contact with the surface 130, and a generally linear contact with the surface 132. The clamped ferrules 116, 126 may be constrained in at least four degrees of freedom, for example, a translational DOF in the X-direction, a translational DOF in the Y-direction, a rotational DOF corresponding to pitch, and a rotational DOF corresponding to yaw. Optionally, a rotational DOF corresponding to roll about a Z-direction longitudinal axis and a translational DOF in the Z-direction may be remain at least partially unconstrained so that the surface of the ferrules may be permitted to roll, as least slightly, with respect to the alignment fixture about the Z-axis. With the ferrules 116, 126 constrained by the clamping members 140, 142 and the groove surfaces 130, 132, the optical fibers 110, 120 may be aligned with each other. The ferrules 116, 126 may remain constrained during cleaning and operational configurations as will be described.

As shown in FIG. 1, a channel 146 may extend between the block-shaped clamping members 140, 142. In a retracted configuration, as shown in FIG. 2B, the cleaning media 106 may be retracted from between the ferrules 116, 126 and may be positioned in the channel 146. In a cleaning configuration, as shown in FIG. 1 and FIG. 2A, the cleaning media 106 may be positioned between the alignment fixture 102 and the clamping assembly 104 and between the ferrules 116, 126 to clean the distal face of the fiber 110, the distal face of the fiber 120, the distal surface 118 of the ferrule 116, and/or the distal surface (not shown) of the ferrule 126. The distal faces of the fibers 110, 120 may be cleaned simultaneously by being in contact with opposite sides of the cleaning media. Alternatively, the distal face of fiber 110 may be cleaned separately from the distal face of the fiber 120. For example, the cleaning media may be moved in the Z-direction to contact and clean the distal face of fiber 110 separately from the contacting and cleaning of the distal face of the fiber 120. As another example, the ferrule 116 (or the ferrule 126) may be moved in the Z-direction toward the cleaning media for the cleaning media to contact and clean the distal face of fiber 110 (or the distal face of fiber 120).

The cleaning assembly 103 may include the cleaning media 106 and a retraction mechanism 153. The cleaning media 106 may be a cleaning ribbon or cleaning tape configured to remove particulate matter from a face of an optical fiber. Cleaning media 106 may be an elongated, flexible strip of material having a generally rectangular configuration. Cleaning media 106 may include a first surface 148 opposite a second surface 152 (e.g., a front surface and a rear surface), as will be described in further detail below. Cleaning media 106 may be composed of a lint-free material, including, for example, microfiber, polyester, a woven material, or a non-woven material, among other materials. In some examples, cleaning media 106 may be composed of a woven material having a thread pitch of 110 to 160 threads per inch in the perpendicular direction of the weave. The material of cleaning media 106 may have a thickness between about 0.002 inches and about 0.010 inches, for example. In some examples, the cleaning media 106 may be dry. In some examples, the cleaning media may be wetted by, for example by a sprayed-on fluid from a fluid dispenser or by being drawn through a fluid reservoir. In some examples, cleaning media 106 may include an adhesive on a surface thereof, such that the surface is sticky or tacky. The adhesive may facilitate removal of particulate matter from the face of an optical fiber. For example, while some cleaning media may be wiped across the face of the optical fiber, a tacky or adhesive media may be blotted, pushed onto the face, and removed in a movement perpendicular to the surface. Cleaning media 106 may be arranged with an adhesive on the front surface, the rear surface, or both. In examples having an adhesive, when the face of an optical fiber contacts cleaning media 106, the adhesive might not transfer to the face of optical fiber. In some examples, cleaning media 106 may be non-tacky and might not include an adhesive.

The cleaning assembly 103 includes the retraction mechanism 153 which may include an actuator to move the cleaning media 106 in and out of the channel 146 and into and out of a gap 154 between the ferrules 116, 126. The retraction mechanism 153 may also house the cleaning media 106 when the ferrules are in an operational configuration with the optical fibers in physical contact. As will be described in greater detail below (e.g., FIG. 6), the cleaning assembly may include additional components including forwarding or rewinding mechanisms, actuators that move the cleaning media 106 into and out of the channel 146, actuators that move the cleaning media toward or away from the distal surfaces of the ferrules 116, 126, cleaning fluids, cleaning fluid dispensers, and other components, media, or materials that may be used to clean the distal faces of the fibers 110, 120.

Figure 2C:
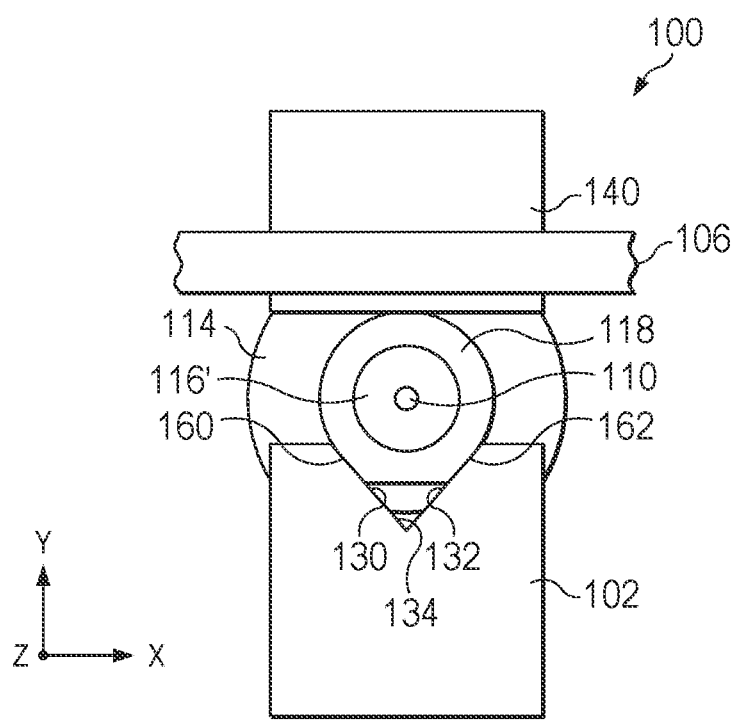
FIG. 2C illustrates a cross-sectional view of an optical fiber alignment assembly with ferrules having an alternative shape, according to some examples.

FIG. 2C illustrates an alternative embodiment of a ferrule 116' that may include flat surfaces 160, 162 arranged at approximately 90 degrees to each other. The surfaces 160, 162 may contact the surfaces 130, 132, respectively. The contact may be a linear contact between the surfaces. In some examples the angle between the surfaces 160, 162 may be slightly larger or smaller than the angle between the surfaces 130, 132. In this alternative example, the mating ferrule 126 may, optionally, have a corresponding set of flat surfaces similar to ferrule 116'.

Before connecting optical fibers for operational use, the tips or faces of the optical fibers that are placed in contact with one another may be cleaned. As used herein, the term optical fiber may refer to a cladding and one or more cores. If optical fibers are connected without proper cleaning, one or both of the optical fibers may be contaminated. Contamination of an optical fiber may result in particulate matter becoming embedded in the face of the optical fiber or scratching the face of the optical fiber, which may negatively affect the transmission of light signals through the optical fiber connection or cause light signals to be detrimentally reflected from the optical fiber connection. Further, once one optical fiber is contaminated, the contaminated optical fiber may in turn contaminate the other optical fiber connected to the contaminated fiber. Should the optical fiber become contaminated or damaged, the device incorporating the optical fiber (e.g., a medical instrument and/or a medical manipulator system connectable to the medical instrument) may be unable to be used until cleaned or repaired by a skilled technician. Such damage can be very costly to repair and can prevent usage of the device.

As used herein, the term particulate matter may refer to any foreign matter or substance present on a face of an optical fiber, such as airborne dust particles, lint, and fabric, among other dirt and debris. Particulate matter may also be generated when friction between components of two mating fiber connectors (e.g., a fiber connector of a medical instrument and a fiber connector of a medical manipulator system) are brought together to connect two optical fibers. An optical fiber may be considered to be contaminated when particulate matter is present on a face of the optical fiber.

Optical fiber cleaning assemblies described herein may be used to clean an optical fiber of a device, such as a medical instrument (e.g., a catheter) having a fiber optic shape sensor, and/or an optical fiber of a system, such as a medical manipulator system for controlling and guiding the medical instrument. While the present disclosure refers primarily to medical instruments and medical systems, it will be readily understood by one of ordinary skill in the art that the optical fiber alignment and cleaning assemblies described herein may be used to clean any optical fibers or optical fiber ferrules.

Figure 3:
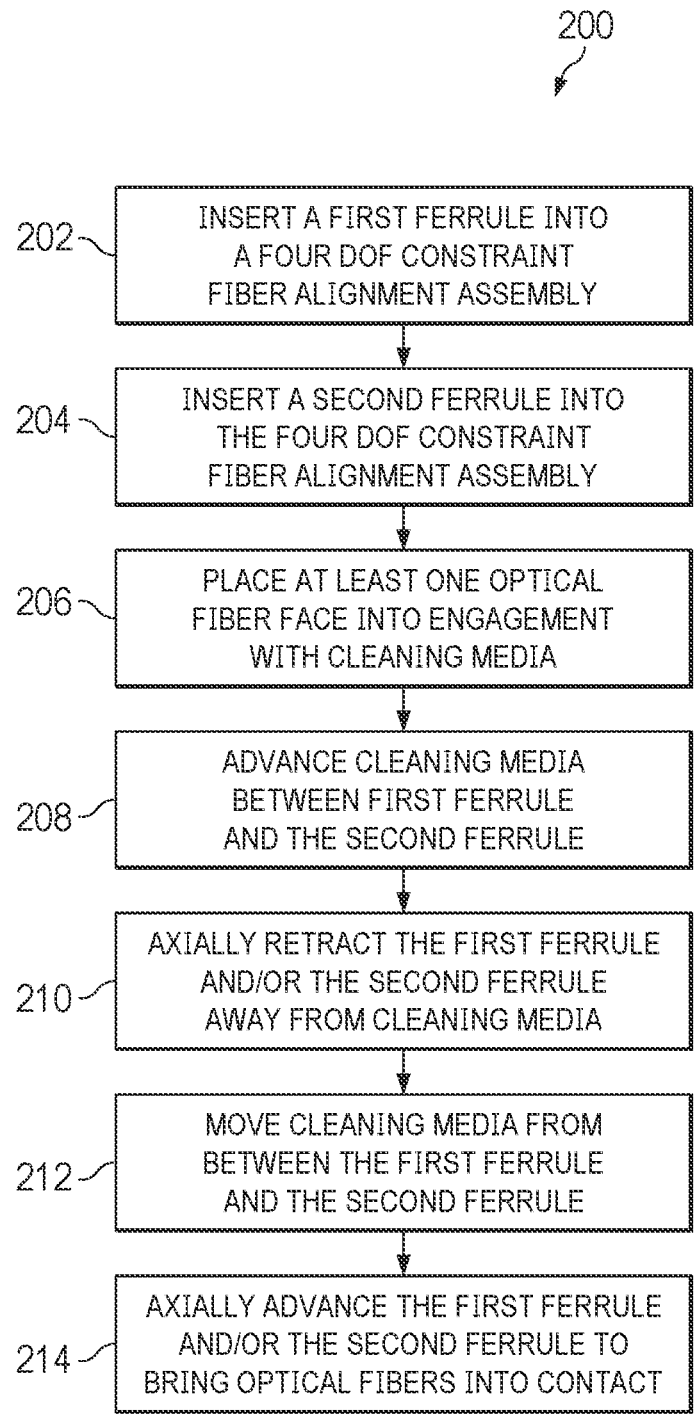
FIG. 3 is a flow chart illustrating a method for aligning and cleaning one or more optical fibers, according to some examples.

FIG. 3 is a flow chart illustrating a method 200 for aligning and cleaning one or more optical fibers, according to some examples. The method 200 is illustrated as a set of operations or processes. The processes illustrated in FIG. 3 may be performed in a different order than the order shown in FIG. 3, and one or more of the illustrated processes might not be performed in some embodiments of method 200. Additionally, one or more processes that are not expressly illustrated in FIG. 3 may be included before, after, in between, or as part of the illustrated processes. In some embodiments, one or more of the processes of method 200 may be implemented, at least in part, in the form of executable code stored on non-transitory, tangible, machine-readable media that when run by one or more processors (e.g., the processors of a control system) may cause the one or more processors to perform one or more of the processes.

Figure 4A:
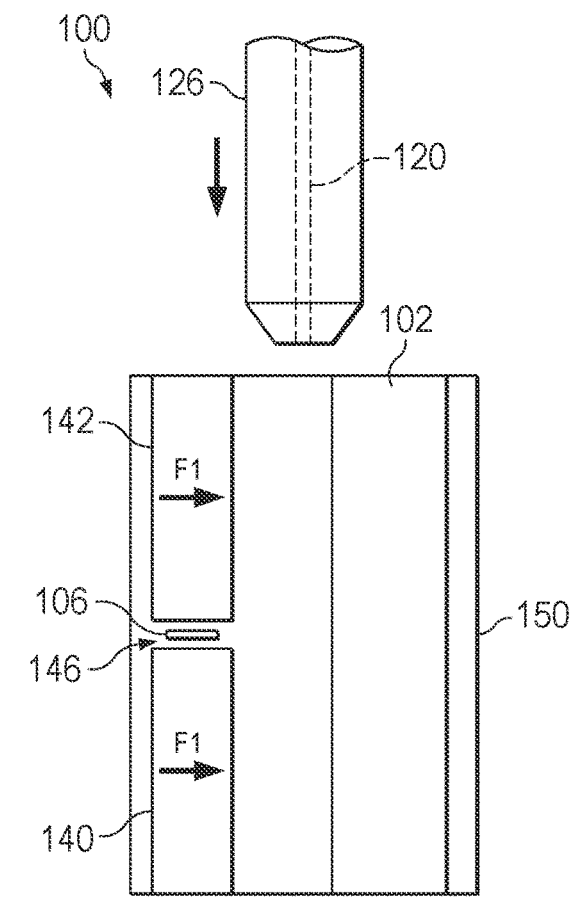
FIG. 4A illustrates a pair of ferrules approaching an optical fiber alignment assembly, according to some examples.
Figure 4B:
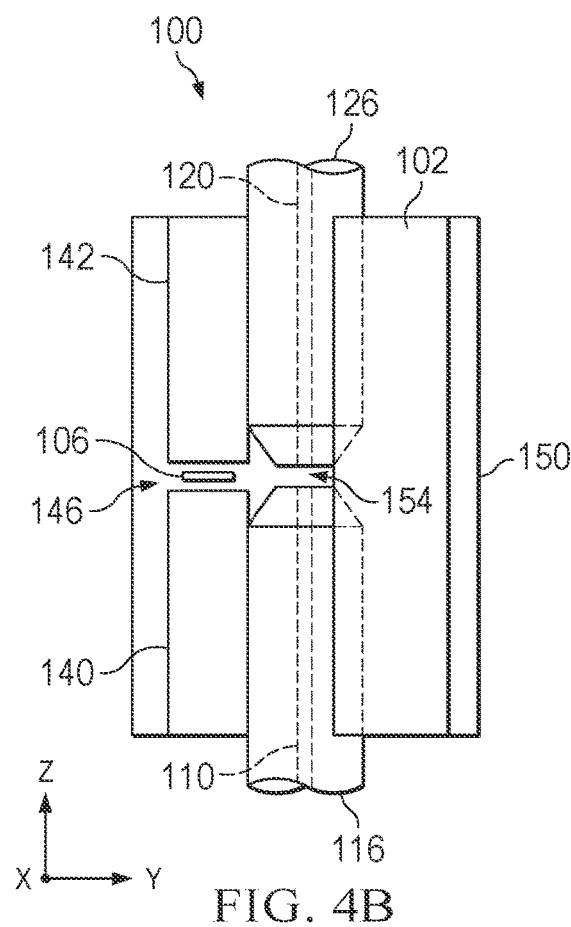
FIG. 4B illustrates the pair of ferrules of FIG. 4A coupled within the optical fiber alignment assembly, according to some examples.

At a process 202 a first optical fiber ferrule may be advanced into the four degree of freedom constraint fiber optic alignment assembly. For example, and with reference to FIG. 4A, the optical fiber ferrule 116 may be advanced toward the optical fiber alignment assembly 100 and the clamping member 140 may clamp the ferrule 116 against the surfaces 130, 132 of the v-groove 134 with the clamping force F1. As shown in FIG. 4B, the optical fiber ferrule 116 may be constrained in four degrees of freedom (e.g., a translational DOF in the X-direction, a translational DOF in the Y-direction, a rotational DOF corresponding to pitch, and a rotational DOF corresponding to yaw) by the clamping member 140. Optionally, a rotational DOF corresponding to roll about a Z-direction longitudinal axis and a translational DOF in the Z-direction may be at least partially unconstrained. The first optical fiber ferrule may be advanced by a ferrule motion mechanism that may include an actuator (e.g., a manual, electrical, pneumatic actuator) or a biasing member (e.g., a spring) to provide an axial force.

At a process 204 a second optical fiber ferrule may optionally be advanced into the four degree of freedom constraint fiber optic alignment assembly. For example, and with reference to FIG. 4A, the optical fiber ferrule 126 may be advanced toward the optical fiber alignment assembly 100 and the clamping member 142 may clamp the ferrule 126 against the surfaces 130, 132 of the v-groove 134 with the clamping force F1. As shown in FIG. 4B, the optical fiber ferrule 126 may be constrained in four degrees of freedom (e.g., a translational DOF in the X-direction, a translational DOF in the Y-direction, a rotational DOF corresponding to pitch, and a rotational DOF corresponding to yaw) by the clamping member 142. Optionally, a rotational DOF corresponding to roll about a Z-direction longitudinal axis and a translational DOF in the Z-direction may be at least partially unconstrained. The second optical fiber ferrule may be advanced by a ferrule motion mechanism that may include an actuator (e.g., a manual, electrical, pneumatic actuator) or a biasing member (e.g., a spring) to provide an axial force. In some examples, the process 204 may be omitted because the second optical fiber ferrule may already be clamped (e.g., permanently clamped) in the alignment assembly and only the first optical fiber ferrule moves in and out of the alignment assembly.

With the ferrules 116, 126 inserted into the alignment assembly 100 in a cleaning configuration, a gap 154 may extend between the distal faces of the ferrules 116, 126. The gap 154 may be sized to receive the cleaning media 106.

Figure 4C:
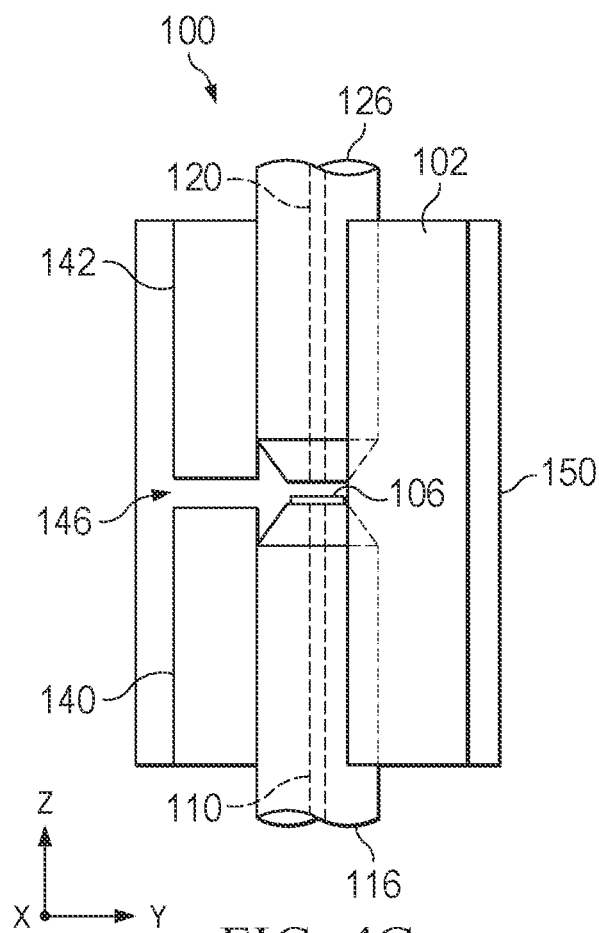
FIG. 4C illustrates the optical fiber alignment assembly of FIG. 4A with one of the ferrules and/or optical fibers in contact with a cleaning media.

At a process 206, at least one of the optical fibers within the inserted ferrules may engage the cleaning media. For example and with reference to FIG. 4C, the cleaning media 106 may be moved in a Y-direction from the channel 146 and into the gap 154 between the ferrules 116, 126. The distal face of the fiber 110 and optionally the distal surface 118 of the ferrule 116 may engage the cleaning media 106. In some examples, the position of the cleaning media 106 in a Z-direction may be adjustable to bring the cleaning media 106 into contact with the distal face of the fiber 110 and the surface 118. In some examples, the position of the ferrule 116 in the Z-direction may be adjustable to move the ferrule 116 and the fiber 110 into contact with the cleaning media 106.

At a process 208, the cleaning media may be advanced within the gap between the first and second ferrules. For example, with the cleaning media 106 engaged with the distal face of the fiber 110, the cleaning media within the gap 154 between the ferrules 116, 126 may be advanced (e.g., in an X-direction) across the distal face of the fiber 110 to carry away any debris or particulates from the distal face of the fiber 110. Optionally, a light pressure in the Z-direction (axial direction) may be applied to urge the ferrule 116 toward the cleaning media 106 and into sustained contact with the cleaning media 106 while the cleaning media is advanced across the distal face of the fiber 110. The pressure may be generated by a biasing mechanism such as a spring or by the ferrule motion mechanism. Optionally, a light pressure in the Z-direction may be applied to urge the cleaning media 106 toward the ferrule 116 and into sustained contact with the ferrule 116 while the cleaning media is advanced across the distal face of the fiber 110.

Figure 4D:
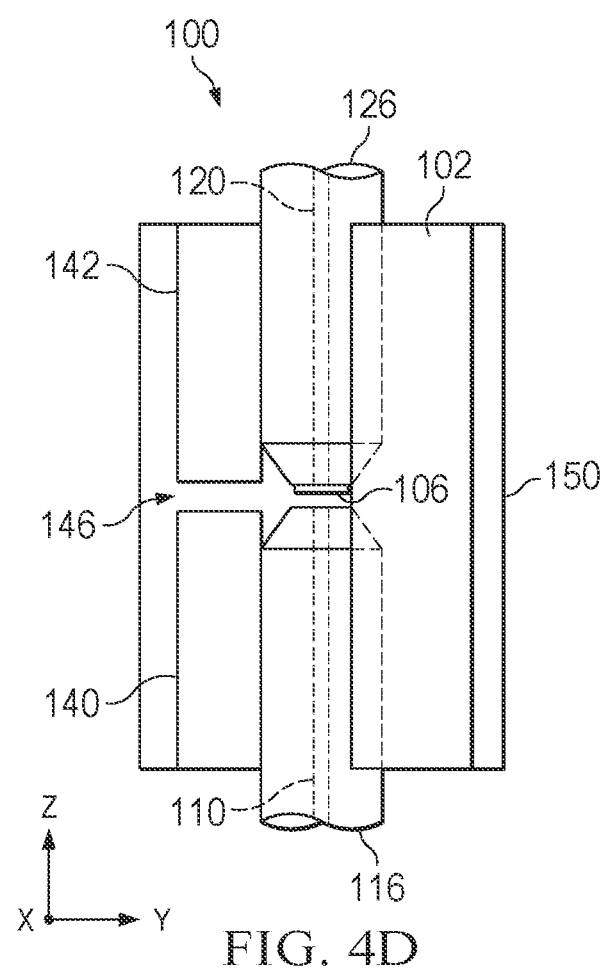
FIG. 4D illustrates the optical fiber alignment assembly of FIG. 4A with one of the ferrules and/or optical fibers in contact with a cleaning media.

Optionally, with reference to FIG. 4D, the processes 206 and 208 may be repeated to clean the distal face of the fiber 120. For example, the distal face of the fiber 120 and optionally the distal surface of the ferrule 126 may engage the cleaning media 106. In some examples, the position of the cleaning media 106 in a Z-direction may be adjustable to bring the cleaning media 106 into contact with the distal face of the fiber 120 and the distal surface of ferrule 126. In some examples, the position of the ferrule 126 in the Z-direction may be adjustable to move the ferrule 126 and the fiber 120 into contact with the cleaning media 106. With the cleaning media 106 engaged with the distal face of the fiber 120, the cleaning media within the gap 154 between the ferrules 116, 126 may be advanced (e.g., in an X-direction) across the distal face of the fiber 120 to carry away any debris or particulates from the distal face of the fiber 120. Optionally, a light pressure in the Z-direction may be applied to urge the ferrule 126 toward the cleaning media 106 and into sustained contact with the cleaning media 106 while the cleaning media is advanced across the distal face of the fiber 120. Optionally, a light pressure in the Z-direction may be applied to urge the cleaning media 106 toward the ferrule 126 and into sustained contact with the ferrule 126 while the cleaning media is advanced across the distal face of the fiber 110.

Optionally, the processes 206 and 208 may be performed to clean the distal face of the fiber 110 and the distal face of the fiber 120 simultaneously. For example, the distal face of the fiber 110 and the distal face of the fiber 120 may engage the cleaning media 106 at the same time (e.g., fiber 110 engaged with cleaning media surface 148 and fiber 120 engaged with cleaning media surface 152). In some examples, the position of the ferrule 116 and the position of the ferrule 126 in the Z-direction may be adjustable to move the ferrules 116, 126 and their fibers into contact with the cleaning media 106. With the cleaning media 106 engaged with the distal faces of the fibers 110, 120, the cleaning media within the gap 154 between the ferrules 116, 126 may be advanced (e.g., in an X-direction) across the distal face of the fibers 110, 120 to carry away any debris or particulates from the distal face of the fibers 110, 120. Optionally, a light pressure in the Z-direction may be applied to urge the ferrule 126 toward the cleaning media 106 and into sustained contact with the cleaning media 106 while the cleaning media is advanced across the distal face of the fiber 120. Optionally, a light pressure in the Z-direction may be applied to urge the ferrule 116 toward the cleaning media 106 and into sustained contact with the ferrule 116 while the cleaning media is advanced across the distal face of the fiber 110.

Optionally, various techniques may be used to optimize the cleaning of the optical fibers. For example, particulate detection systems may employ optical or other types of sensors to determine whether sufficient particulate removal has occurred. In other examples, the cleaning media 106 may be advanced at a predetermined rate, or for a predetermined length, or for a predetermined time, sufficient to remove substantially all particulates.

Referring again to FIG. 3, at a process 210, the first and/or second ferrules may be retracted away from the cleaning media. For example, the ferrule 116 and the ferrule 126 may sequentially or simultaneously be retracted in a Z-direction away from the cleaning media 106 after the fibers 110, 120 have been cleaned.

At a process 212, the cleaning media may be moved from between the first and second ferrules. For example, the cleaning media 106 may be moved in a Y-direction from the gap 154 between the ferrules 116, 126 and into the channel 146, as shown in FIG. 4B.

Figure 4E:
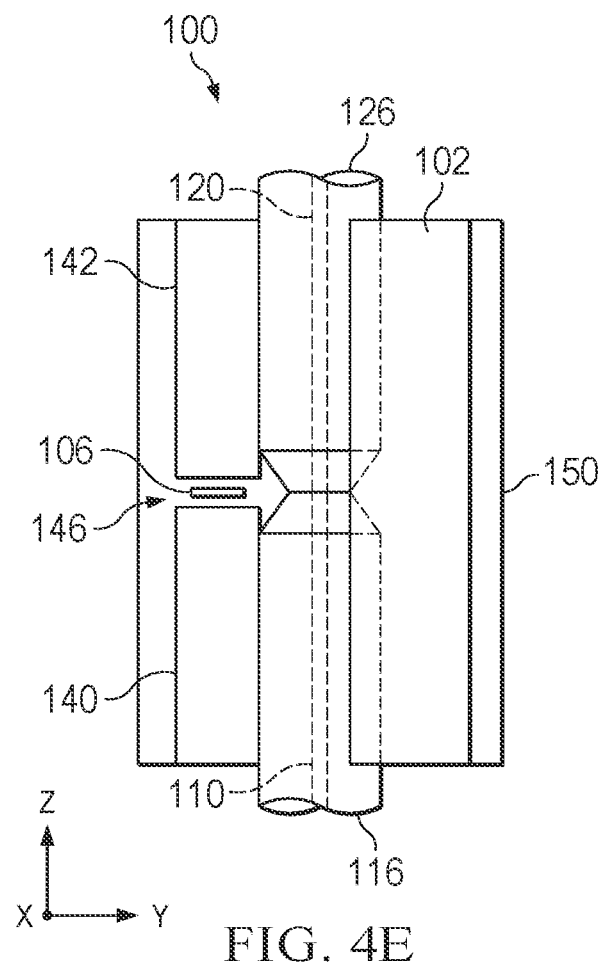
FIG. 4E illustrates the optical fiber alignment assembly of FIG. 4A with the optical fibers engaged with each other and the cleaning media retracted.

At a process 214, the first and/or second ferrules may be advanced to bring the optical fibers into an operational configuration in which the optical fibers are in physical contact or otherwise are in sufficient proximity to convey light between the optical fibers. For example as shown in FIG. 4E, the ferrule 116 and the ferrule 126 may be advanced toward each other in the Z-direction into an operational configuration in which the optical fibers 110, 120 are in physical contact or otherwise are in sufficient proximity to convey light between the optical fibers. Alternatively, instead of moving both ferrules, the ferrule 116 alone may be moved to place the optical fiber 110 in contact with the optical fiber 120, or the ferrule 126 alone may be moved to place the optical fiber 120 in contact with the optical fiber 110.

Figure 5:
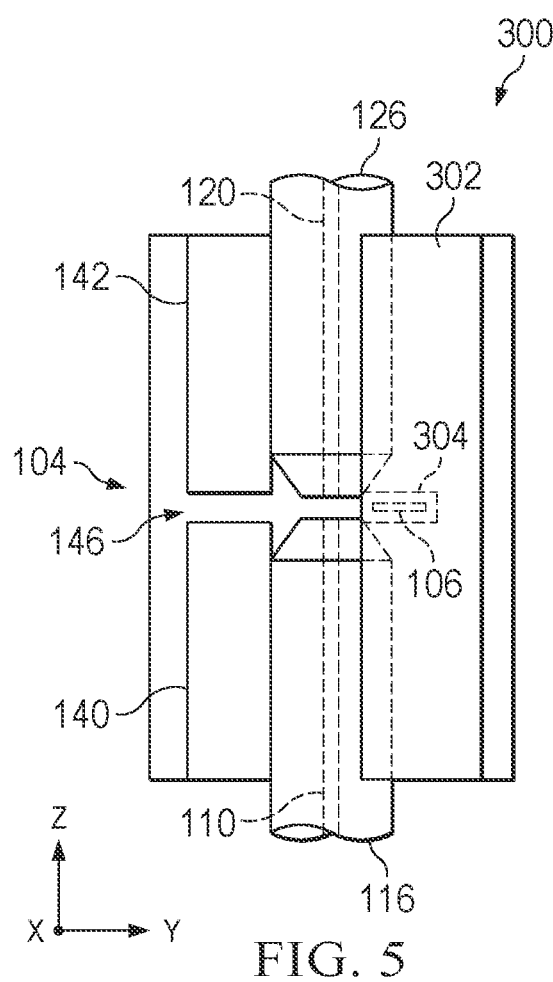
FIG. 5 illustrates a pair of ferrules coupled with an alternative optical fiber alignment assembly with the cleaning media retracted from between the ferrules, according to some examples.

FIG. 5 illustrates an alternative example of an optical fiber alignment assembly 300 that may be substantially similar to the optical fiber alignment assembly 100 in structure and in use except for the differences as described. The optical fiber alignment assembly 300 includes an alignment fixture 302, the clamping assembly 104, and, optionally, the cleaning media 106. In this example the alignment feature 302 includes a channel 304 sized to allow the cleaning media 106 to be retracted into the channel 304 after cleaning, before cleaning, or when the optical fiber alignment assembly 300 is in an operational configuration. In some alternatives, the cleaning media may extend into either channel 304 or 146. In some alternatives, the channel 146 may be eliminated and a unitary clamping assembly may replace clamping assembly 104 such that the cleaning media 106 may be retracted only into the channel 304.

Figure 6:
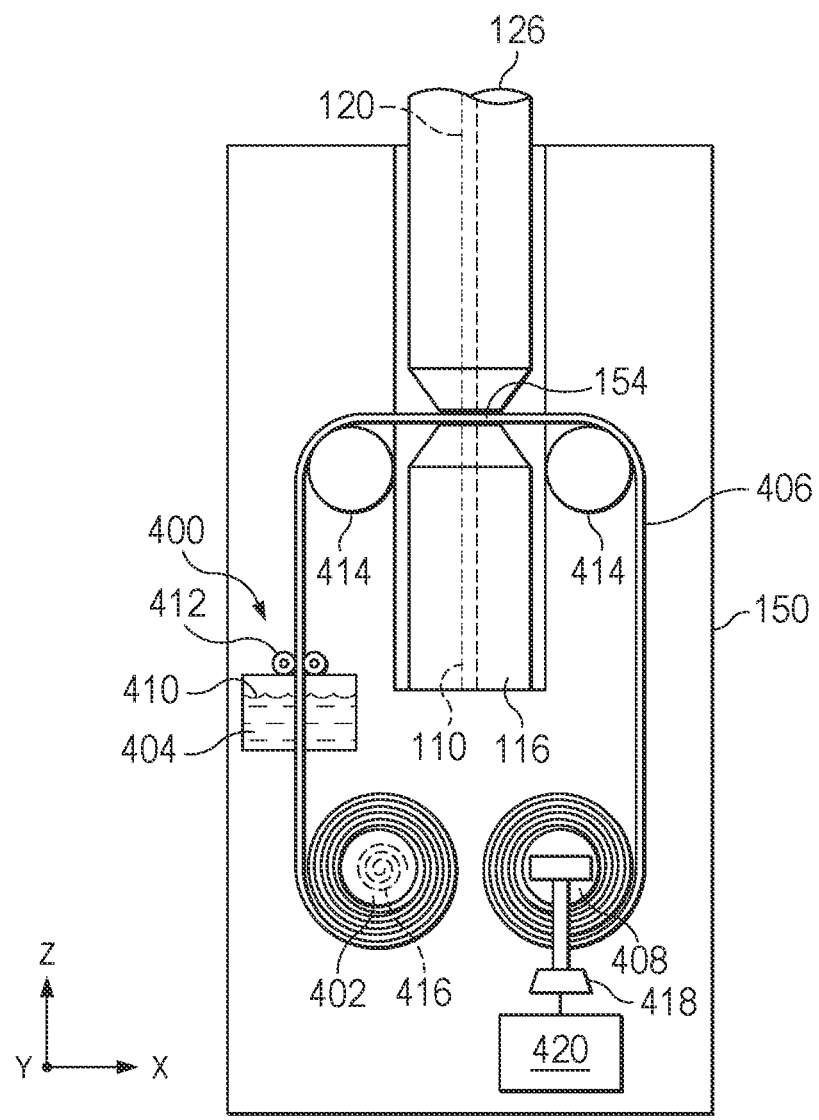
FIG. 6 illustrates a cleaning assembly and a pair of ferrules coupled within an optical fiber alignment assembly, according to some examples.

FIG. 6 illustrates an example of a cleaning assembly 400 with the pair of ferrules 116, 126 coupled within the optical fiber alignment assembly 100. In some examples, the housing 150 of the alignment assembly 100 may also house the cleaning assembly 400. In other examples, one or more components of the cleaning assembly 400 may be housed separately from and may be interchangeable with the optical fiber alignment assembly 100. In this example, a cleaning media 406 may be substantially the same as cleaning media 106 in structure and in use except for the differences as described. In a cleaning configuration as shown in FIG. 6, the cleaning media 406 extends between the ferrules 116, 126. The cleaning media 406 may be stored on a first spool 402 in a dry state. Cleaning media 406 may pass through a reservoir 404 containing a fluid 410 so that cleaning media 406 is impregnated or wetted with index matching fluid 410 as cleaning media 406 is drawn from first spool 402 onto a second spool 408 and through reservoir 404. In some examples, cleaning media 406 impregnated with the fluid 410 may pass through a fluid removal device 412, such as one or more pairs of pinch rollers or a squeegee. Fluid removal device 412 may help to remove excess fluid 410 from cleaning media 406 in order to prevent build-up of fluid 410 at an optical fiber face, which may attract or capture particulate matter. Cleaning media 406 impregnated with fluid 410 may then move through the gap 154 between the ferrules 116, 126 so that cleaning media 406 may be brought into contact with one or both of the optical fibers 110, 120.

As the cleaning media 406 is drawn from first spool 402 onto second spool 408, cleaning media 406 may be drawn over guide members 414, such as posts or rollers. Guide members 414 may help to maintain cleaning media 406 under tension or to adjust the tension of cleaning media 406 and to position cleaning media 406 at a desired location and/or orientation, such as substantially parallel to the distal faces of the ferrules 116, 126. Once cleaning media 406 is used to clean an optical fiber 110, 120 and moves through the gap 154, cleaning media 406 may be wound on the second spool 408.

In some examples, fluid 410 may be a gel or have a high viscosity so as to inhibit leakage or migration. As cleaning media 406 impregnated with fluid 410 leaves reservoir 404, cleaning media 406 may pass through fluid removal device 412 so as to remove excess fluid from cleaning media 406. Excess fluid 410 may be returned to reservoir 404. As cleaning media 406 advances from first spool 402 to second spool 408, additional portions of cleaning media 406 are drawn into and through reservoir 404 so as to become coated with the fluid 410. In some examples, the fluid and fluid reservoir may be eliminated and a dry cleaning media, a previously wetted cleaning media, or an adhesive cleaning media may be used.

In some examples, first spool 402 may include a biasing mechanism 416 configured to maintain cleaning media 406 extending from first spool 402 to second spool 408 under tension. Biasing mechanism 416 may be, for example, a spring, or friction drag among other mechanisms configured to apply tension to cleaning media 406. A drive mechanism 418 may be configured to cause rotation of first spool 402 or second spool 408 in order to advance cleaning media 406 from first spool 402 onto second spool 408. In some examples, each of first spool 402 and second spool 408 may include a drive mechanism. Drive mechanism 418 may be mechanically operated and may include for example a gear train. In some examples, drive mechanism 418 is a rotary actuator and may be an electrical motor. In some examples, first spool 402 may freely rotate, and second spool 408 may be rotated by the drive mechanism 418 so that as second spool 408 rotates, cleaning media 406 is drawn from first spool 402 onto second spool 408. In this way, drive mechanism 418 may help to maintain tension on cleaning media 406 so that cleaning media 406 is taut between first and second spools 402, 408, and in the gap 154.

In some examples, drive mechanism 418 is controlled by an actuator 420. Actuator 420 may be a lever, switch (such as a rocker switch), push-button, dial, or the like. In some examples, drive mechanism 418 may be manually operated so that a user can operate actuator 420 in order to cause cleaning media 406 to advance from first spool 402 onto second spool 408. In some examples, a user may control the amount of cleaning media 406 advanced from first spool 402 onto second spool 408. For example, when actuator 420 is a dial, the user may rotate the dial, and the amount of cleaning media 406 advanced from first spool 402 to second spool 408 may correspond to the degree of rotation of the dial. In some examples, drive mechanism 418 may be configured to advance cleaning media 406 by a fixed increment. In some examples, drive mechanism 418 may advance cleaning media 406 by, for example, an increment of about 0.5 cm to about 10 cm, or about 1 cm to about 8 cm, or about 2 cm to about 6 cm. Thus, each time actuator 420 is actuated, such as by moving a switch from a first position to a second position, drive mechanism 418 may advance the cleaning media by a certain amount (e.g., 5 cm).

In some examples, drive mechanism 418 may be an electric motor that is powered by a power source, such as a battery or a regulated power supply. The electric motor may be controlled by an actuator 420, such as a push-button, such that when a user operates the push-button, electric motor rotates first or second spool 402, 408 in order to advance cleaning media 406 by a fixed increment. In some examples, optical fiber cleaning assembly 400 might not include a drive mechanism 418, and a motor of a system having an optical fiber to which cleaning assembly 400 is connected for cleaning the optical fiber may provide the drive mechanism for advancing cleaning media 406.

In some examples, drive mechanism 418 may be automatically actuated when an optical fiber is detected or when an optical fiber contacts cleaning media 406. Optical fiber cleaning assembly 400 may be configured to detect the presence of optical fiber and automatically actuate drive mechanism 418 to advance cleaning media 406. Further, optical fiber cleaning assembly 400 may prevent operation of actuator 420 if an optical fiber is not detected, such as by a sensor of cleaning assembly 400, or may prevent operation of actuator 420 if an error occurs (e.g., interference by a foreign object, lack of cleaning media 406, etc.)

In some examples, an optical fiber cleaning assembly may be integrally formed with an optical fiber alignment assembly and remains in place (e.g., with the cleaning media retracted) when the optical fibers are in an operational configuration. Alternatively, an optical fiber cleaning assembly may be formed as an independent device, separate from the optical fiber alignment assembly 100. The optical fiber cleaning assembly may be temporarily engaged with alignment assembly to perform cleaning and may be removed for refurbishment or disposal during the operational configuration.

Figure 7A:
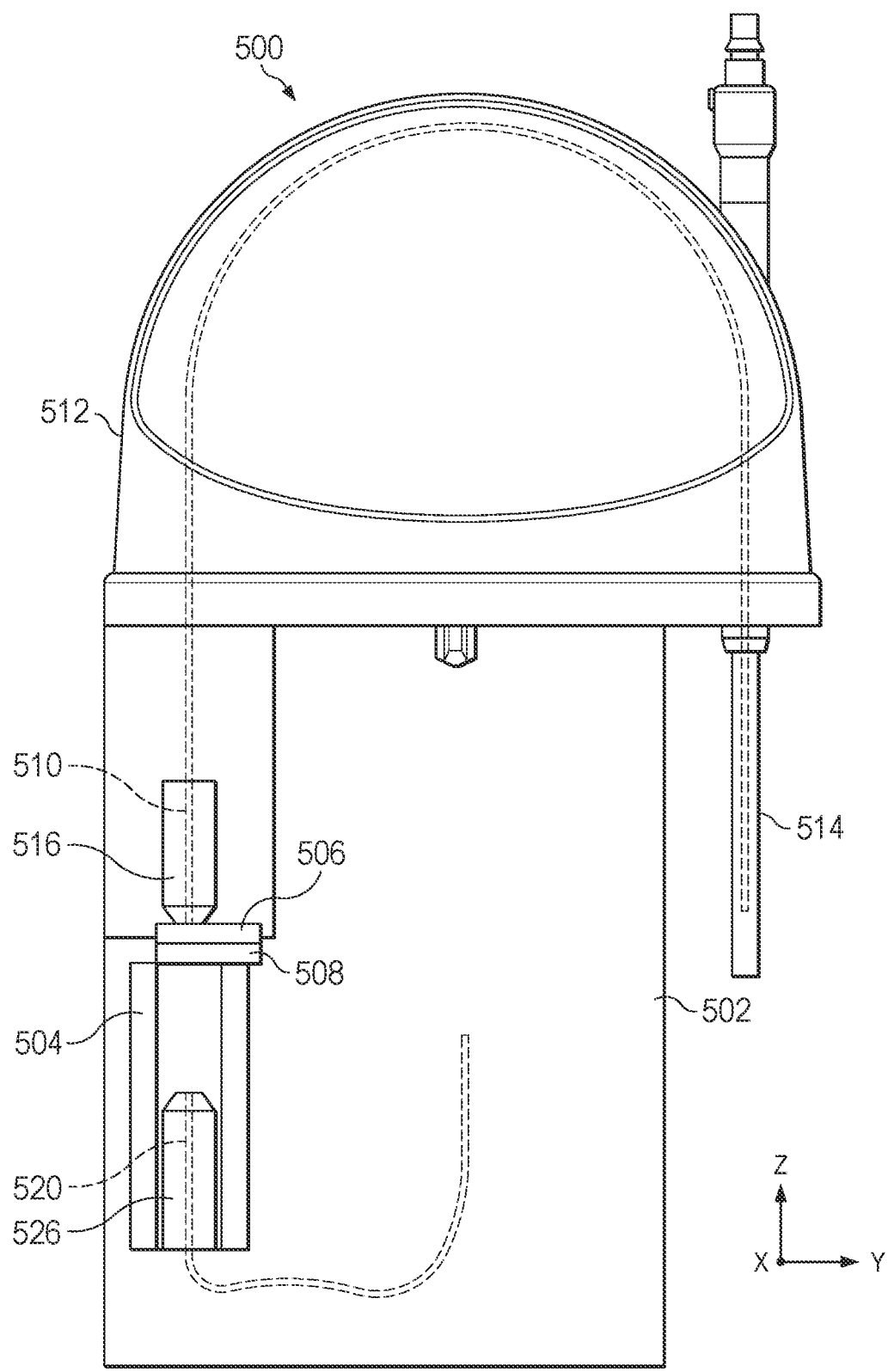
FIG. 7A illustrates an optical fiber alignment assembly for coupling an instrument and an instrument manipulator, according to some examples.
Figure 7B:
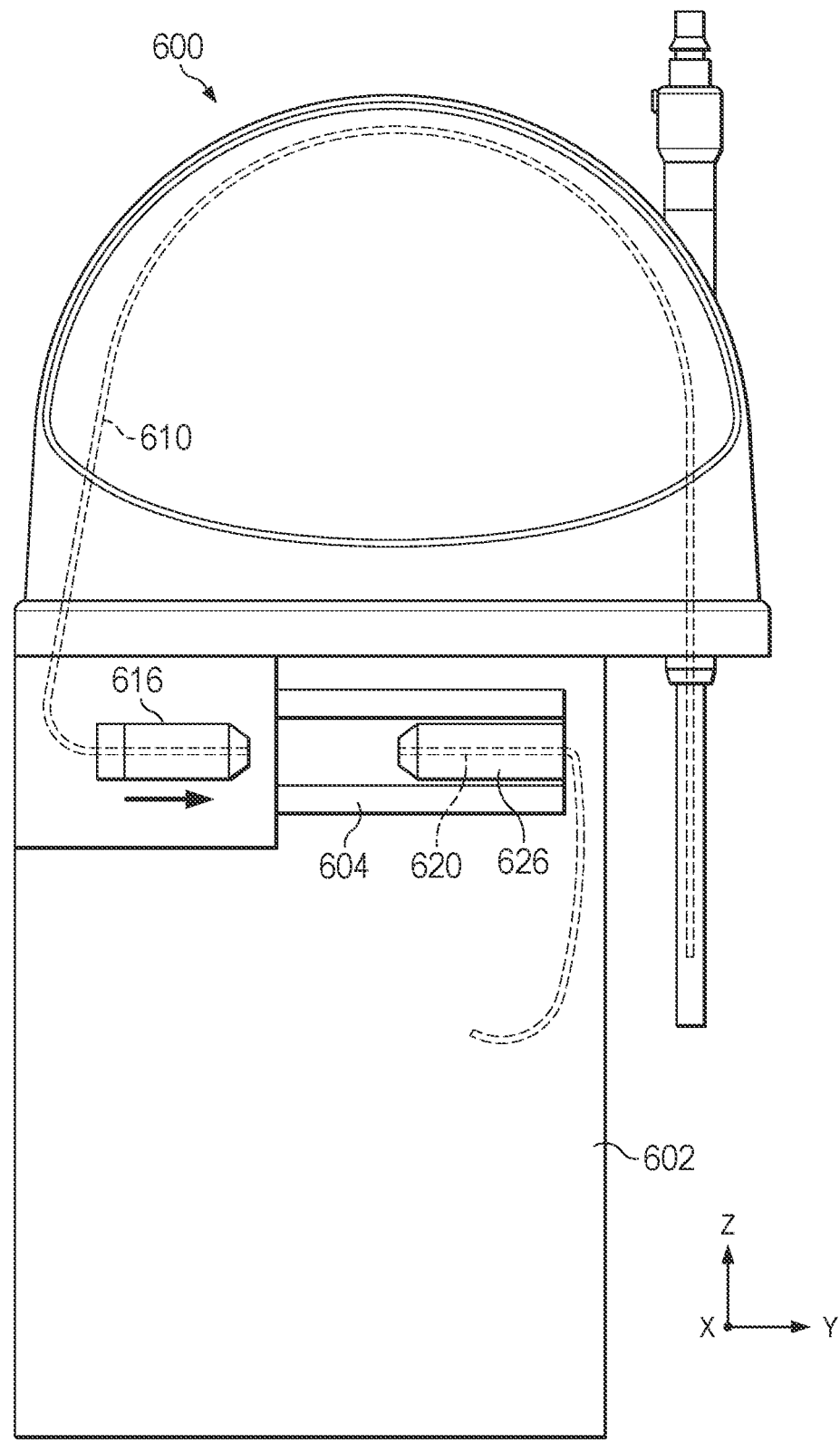
FIG. 7B illustrates an optical fiber alignment assembly for coupling an instrument and an instrument manipulator, according to some examples.
Figure 7C:
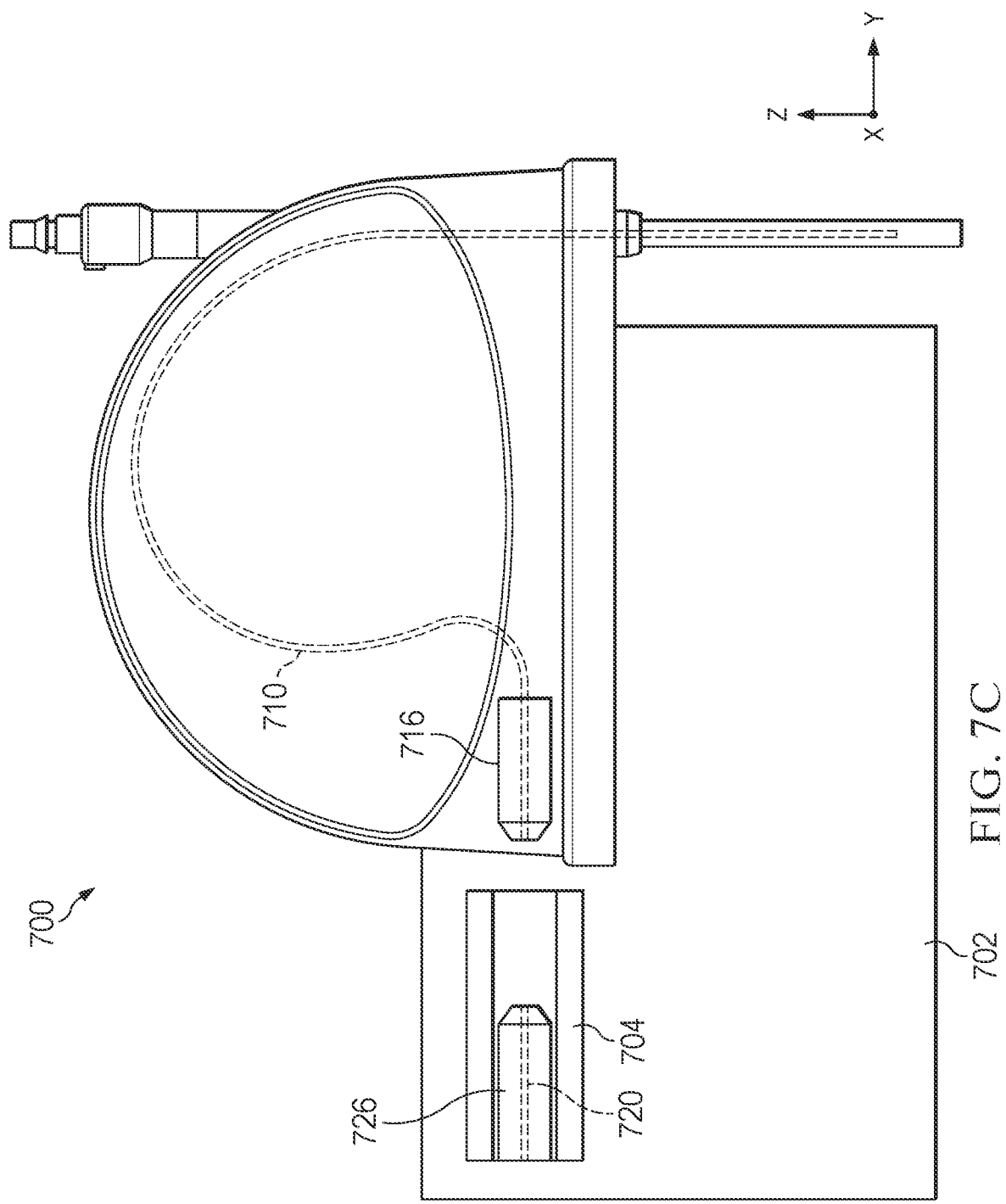
FIG. 7C illustrates an optical fiber alignment assembly for coupling an instrument and an instrument manipulator, according to some examples.

FIG. 7A-C illustrate alternative examples of optical fiber alignment assemblies for coupling an optical fiber of a medical instrument and an optical fiber of an instrument manipulator. In these examples, the optical fiber alignment assembly is housed within instrument manipulator. As compared to designs that require both ferrules to be manipulated into the coupler, these examples may simplify the fiber coupling procedure because the medical instrument may be the only component that is manipulated to achieve the optical connection. In alternative examples, the optical fiber alignment assembly may be housed in the medical instrument or in an adapter unit that extends between the instrument and the instrument manipulator. Such an adapter unit may be disposable or interchangeable.

FIG. 7A illustrates a medical instrument 500 coupled to an instrument manipulator 502. The medical instrument 500 includes a housing 512 coupled to an elongate member 514. An optical fiber 510 extends within the elongate member 514 and into the housing 512. The optical fiber 510 may terminate within an optical fiber ferrule 516. The optical fiber 510 may be substantially similar to optical fibers (e.g., fiber 110) previously described herein. The optical fiber ferrule 516 may be substantially similar to optical fiber ferrules (e.g., ferrule 116) previously described herein. The medical instrument 500 also optionally includes a shutter 506 that covers an opening in the housing 512 through which the ferrule 516 may extend. The shutter 506 may be spring-loaded, manually-actuated, actuated by a controller, or otherwise actuated to open when the ferrule 516 is extended and closed when the ferrule 516 is retracted into the housing 512. The shutter 506 may be biased to a closed position to prevent debris and particulate matter from entering the housing 512 and affecting the performance of the optical fiber 510.

The instrument manipulator 502 may house an optical fiber alignment assembly 504 that may be substantially similar to an optical fiber alignment assembly (e.g., optical fiber alignment assembly 100 optionally including a cleaning assembly) previously described herein. For example, the alignment fixture 102, one or more clamping mechanisms 144 of the clamping assembly 104, and cleaning assembly 103 of the optical fiber alignment assembly 100 may be located in the instrument manipulator 502. An optical fiber 520 extends within instrument manipulator 502 and may couple to components in the instrument manipulator or coupled equipment that generate light and/or analyzed reflected light. For example, the instrument manipulator or coupled equipment may include a laser source (not shown) for generating light and/or an interrogator (not shown) for analyzing the reflected light signals within the optical fiber. The optical fiber 520 may terminate within an optical fiber ferrule 526. The optical fiber 520 may be substantially similar to optical fibers (e.g., fiber 120) previously described herein. The optical fiber ferrule 526 may be substantially similar to optical fiber ferrules (e.g., ferrule 126) previously described herein. The instrument manipulator 502 may also include a shutter 508 that covers an opening in instrument manipulator 502 through which the ferrule 516 may extend into contact with the ferrule 526. The shutter 508 may be spring-loaded, manually-actuated, actuated by a controller, or otherwise actuated to open when the ferrule 516 is extended into the optical fiber alignment assembly 504 and closed when the ferrule 516 is retracted into the housing 512. The shutter 508 may be biased to a closed position to prevent debris and particulate matter from entering the instrument manipulator 502 and affecting the performance of the optical fiber 520.

In some embodiments, the alignment fixture 102, one or more clamping mechanisms 144 of the clamping assembly 104, or cleaning assembly 103 of the optical fiber alignment assembly 100 may be located in the instrument 500. In one example, a clamping mechanism 144 is located in the medical instrument 500 along with the ferrule 516. To interface with the instrument manipulator 502, the clamping mechanism 144 and the ferrule 516 extend into the instrument manipulator 502.

In the example of FIG. 7A, the instrument 500 may latch to the instrument manipulator 502 with a motion that is generally in the Z-direction. With the instrument 500 latched to the instrument manipulator 502, the shutters 506, 508 may be opened to allow passage of the ferrule 516 into the optical fiber alignment assembly 504 to allow for coupling and/or cleaning of the optical fibers 510, 520 in the manner as previously described. The shutter is an example of a debris cover that extends across a portion of the alignment fixture to resist ingress of debris to the alignment fixture. In alternative examples, other types of debris covers, such as a removable dust cover, may be used with or as an alternative to the shutters to minimize particulate collection on the optical fibers.

FIG. 7B illustrates a medical instrument 600 coupled to an instrument manipulator 602. An optical fiber 610 may terminate within an optical fiber ferrule 616. An optical fiber 620 may terminate within an optical fiber ferrule 626. The optical fiber 610 may align with and couple to the optical fiber 620 substantially as the optical fibers aligned and coupled in FIG. 7A, but in this example, the instrument 600 may latch to the instrument manipulator 602 with a motion that is in a +Y direction.

FIG. 7C illustrates a medical instrument 700 coupled to an instrument manipulator 702. An optical fiber 710 may terminate within an optical fiber ferrule 716. An optical fiber 720 may terminate within an optical fiber ferrule 726. The optical fiber 710 may align with and couple to the optical fiber 720 substantially as the optical fibers aligned and coupled in FIG. 7A, but in this example, the instrument 700 may latch to the instrument manipulator 702 with a motion that is in a −Y direction.

Figure 8A:
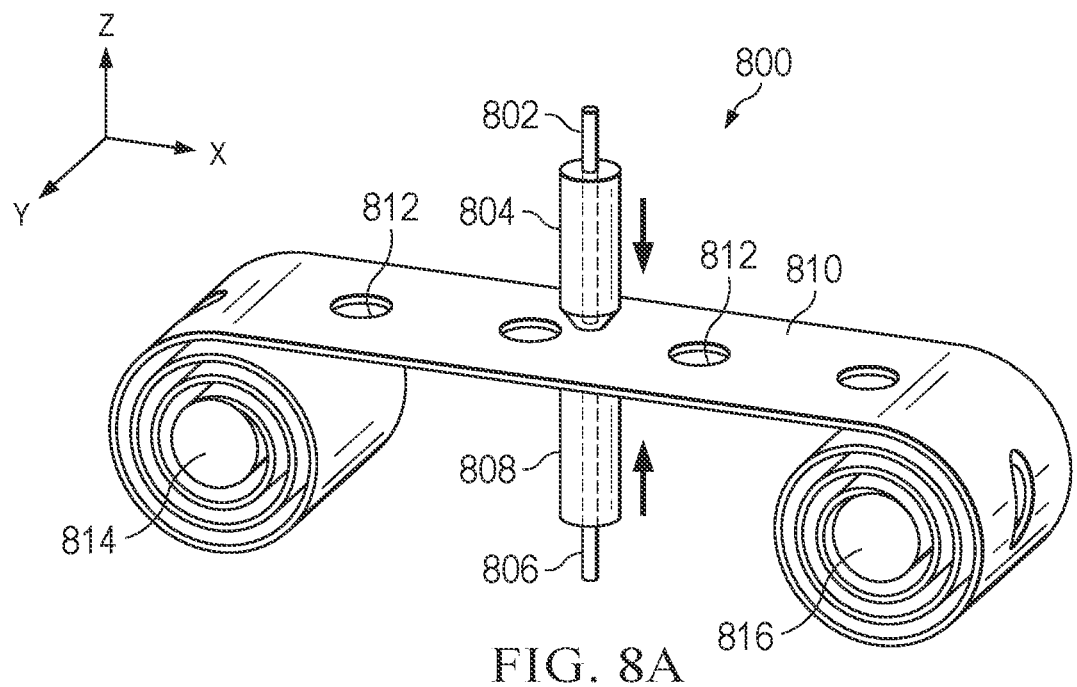
FIG. 8A illustrates a pair of ferrules and a cleaning media with the ferrules in a cleaning configuration, according to some examples.

In some alternative examples, a cleaning media may include a series of apertures that allow the optical fibers to physically connect through the cleaning media. FIG. 8A illustrates a cleaning assembly 800 for cleaning an optical fiber 802 extending within a ferrule 804 and for cleaning an optical fiber 806 extending within a ferrule 808. The optical fibers 802, 806 and ferrules 804, 808 may be substantially similar to the fibers and ferrules previously disclosed herein. The cleaning assembly 800 includes a cleaning media 810 extending between a first spool 814 and a second spool 816. The cleaning media may be substantially similar to the cleaning media 106 except for the differences as described.

Figure 8B:
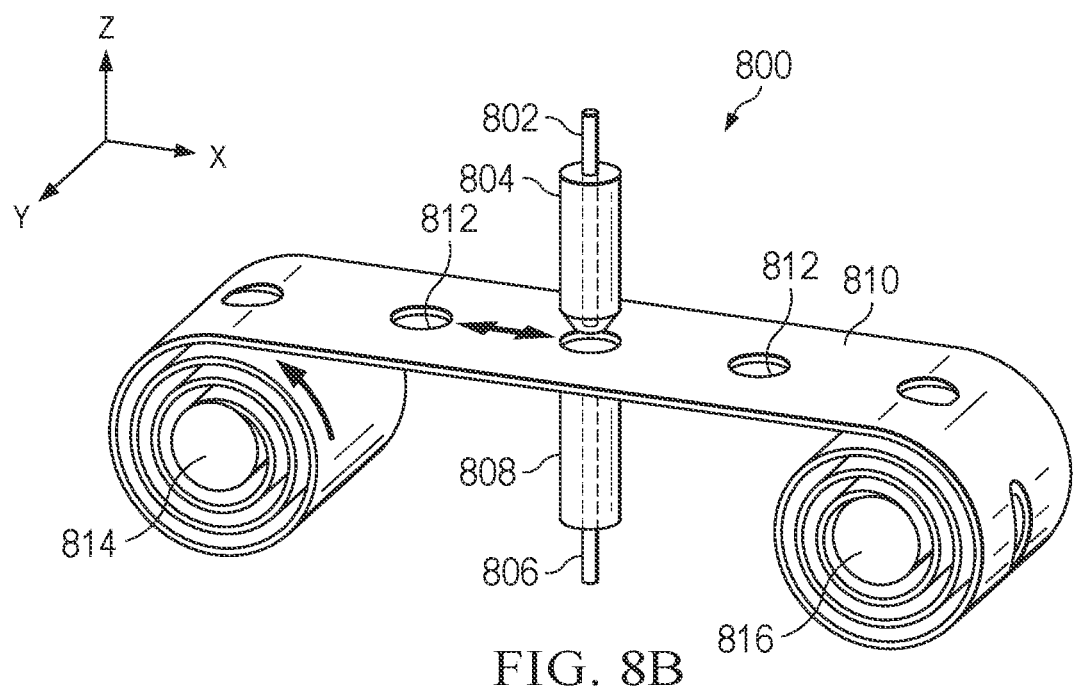
FIG. 8B illustrates the pair of ferrules and cleaning media of FIG. 8A with the ferrules in an operational configuration, according to some examples.

The cleaning media 810 may include a series of apertures 812 that may be separated by a predetermined distance. In some examples, each aperture 812 may have a diameter that is the same as or greater than a diameter of the tip of the optical fiber ferrule 804, 808 (or cores thereof) to be cleaned in order to allow the tip of the optical fiber ferrule 804 to pass through aperture 812. However, in some examples, apertures 812 may have a diameter that is less than a diameter of the tip of the optical fiber ferrule 804, 808 so that the tip of the optical fiber ferrule 804, 808 is visible through aperture 812 but might not pass through aperture 812. In FIGS. 8A and 8B, each aperture 812 is shown as having a circular shape. However, apertures 812 may have any of various shapes, and may be shaped as an oval, ellipse, square, rectangle, or triangle, among other shapes. Apertures 812 may be spaced from one another by a fixed distance, and the length of cleaning media 810 between apertures 812 may be referred to as a cleaning portion. A distance between apertures 812 may be greater than a diameter of each aperture. In some embodiments, the distance between apertures may be about 1 cm to about 10 cm, about 2 cm to about 8 cm, or about 4 cm to about 6 cm.

As shown in a cleaning configuration of FIG. 8A, when the cleaning media 810 extends between the optical fibers 802, 806, the optical fibers may be advanced into contact with the cleaning media 810 and wiped clean as the cleaning media 810 moves across the faces of the optical fibers 802, 806. In this way, optical fibers 802, 806 may be cleaned at the same time. When optical fibers 802, 806 are separated, cleaning media 810 may be advanced so that a cleaning portion of cleaning media 810 may cover a face of at least one of the optical fibers to prevent particulate matter from accumulating on the face of the optical fiber between optical fiber connections.

Cleaning media 810 may include apertures 812 so that connection of optical fiber 802 and optical fiber 806 may be made through cleaning media 810 when an aperture 812 of cleaning media 810 is aligned with optical fibers 802, 806. As shown in an operational configuration of FIG. 8B, when the cleaning media 810 is advanced so that one of the cleaning media apertures 812 extends between the optical fibers 802, 806, the optical fibers may be advanced into physical contact with each other through the aperture 812. In FIGS. 8A and 8B, the cleaning media 810 may move in the X-direction, but (in contrast to the example of FIG. 4A-4D) the cleaning media may remain stationary in the Y-direction and need not be retracted from between the ferrules 804, 808 in the operational configuration.

Figure 9A:
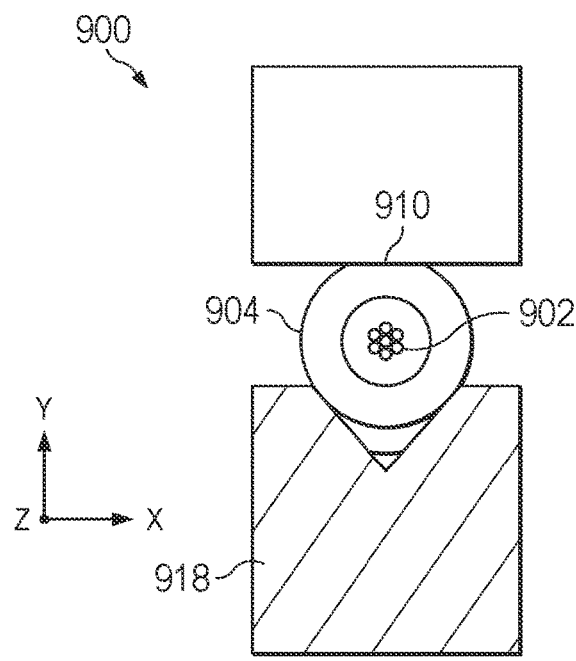
FIG. 9A illustrates a cross-sectional view of the optical fiber ferrule of FIG. 9B, according to some examples.
Figure 9B:
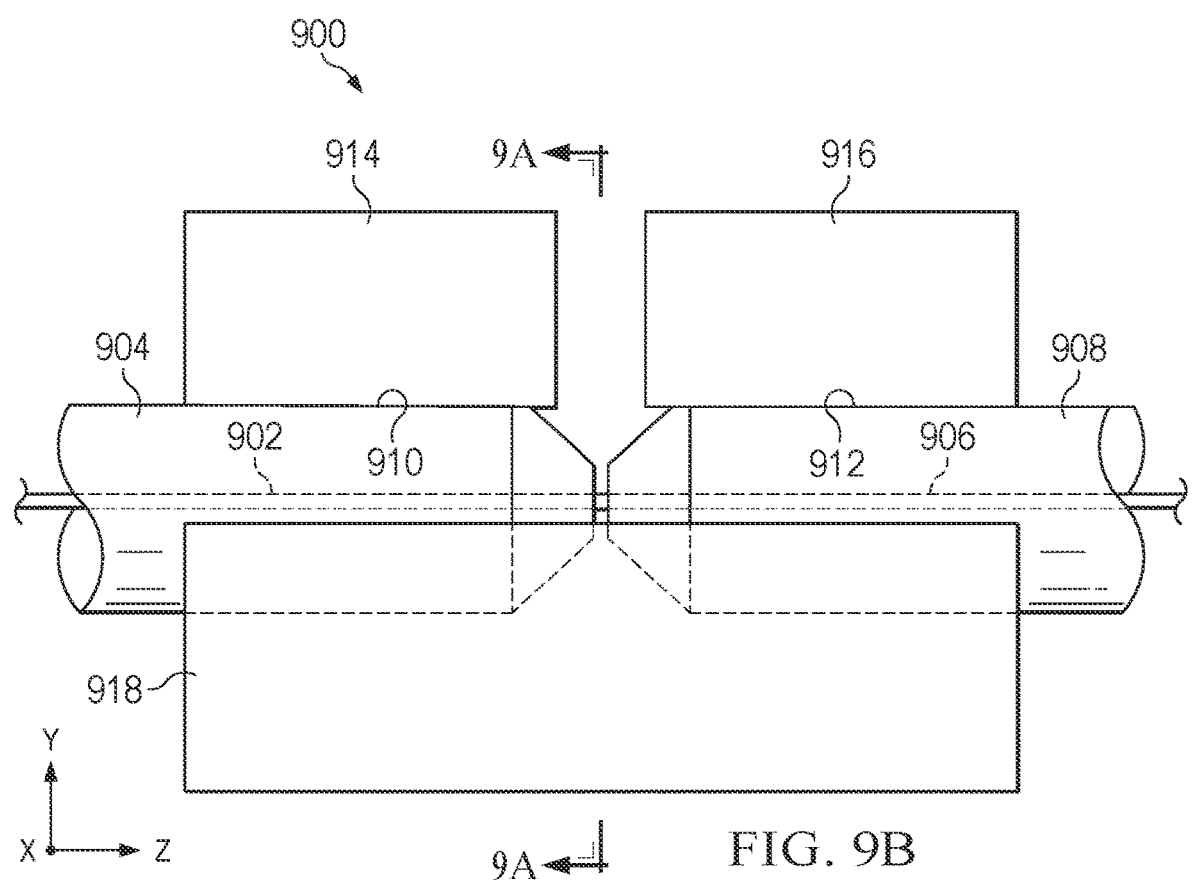
FIG. 9B illustrates a cross-sectional view of an optical fiber ferrule with an elongated flat surface, according to some examples.

In an alternative example, the ferrules may include a flat surface that may further constrain rotational motion of the pair of ferrules. The constrained rotational motion may permit optical fibers with multiple cores to be rotationally aligned so that the individual cores may be aligned. FIGS. 9A and 9B illustrate cross-sectional views of an optical fiber alignment assembly 900. The optical fiber alignment assembly may be substantially similar to optical fiber alignment assembly 100. In this example, an optical fiber 902 terminates in an optical fiber ferrule 904, and an optical fiber 906 terminates in an optical fiber ferrule 908. The optical fibers 902, 906 may be substantially similar to any of the previously described optical fibers with the differences as described. The optical fiber ferrules 904, 908 may be substantially similar to any of the previously described optical fiber ferrules with the differences as described. In this example, the optical fibers 902, 906 may include multiple cores that are aligned by the alignment assembly 900. Because each optical fiber 902, 906 includes multiple cores oriented in a radial pattern, the optical fibers may require rotational alignment in a Z-direction, in additional to the X and Y-direction alignment previously described for alignment assembly 100. In this example, the ferrule 904 includes a flat surface 910, and the ferrule 908 includes a flat surface 912. The flat surfaces may be generally parallel to a longitudinal axis of the ferrules. When a clamping member 914 engages the flat surface 910, the ferrule 904 may be constrained by the clamping member 914 and the alignment fixture 918 in at least four degrees of freedom (e.g., a translational DOF in the X-direction, a translational DOF in the Y-direction, a rotational DOF corresponding to pitch, a rotational DOF corresponding to yaw) and optionally in a rotational DOF corresponding to roll about the Z-direction longitudinal axis. When a clamping member 916 engages the flat surface 912, the ferrule 908 may be constrained by the clamping member 916 and the alignment fixture 918 in at least five degrees of freedom (e.g., a translational DOF in the X-direction, a translational DOF in the Y-direction, a rotational DOF corresponding to pitch, a rotational DOF corresponding to yaw, and a rotational DOF corresponding to roll about the Z-direction longitudinal axis). Thus, the flat surfaces 910, 912 allow for alignment and cleaning of multi-core optical fibers.

Figure 10A:
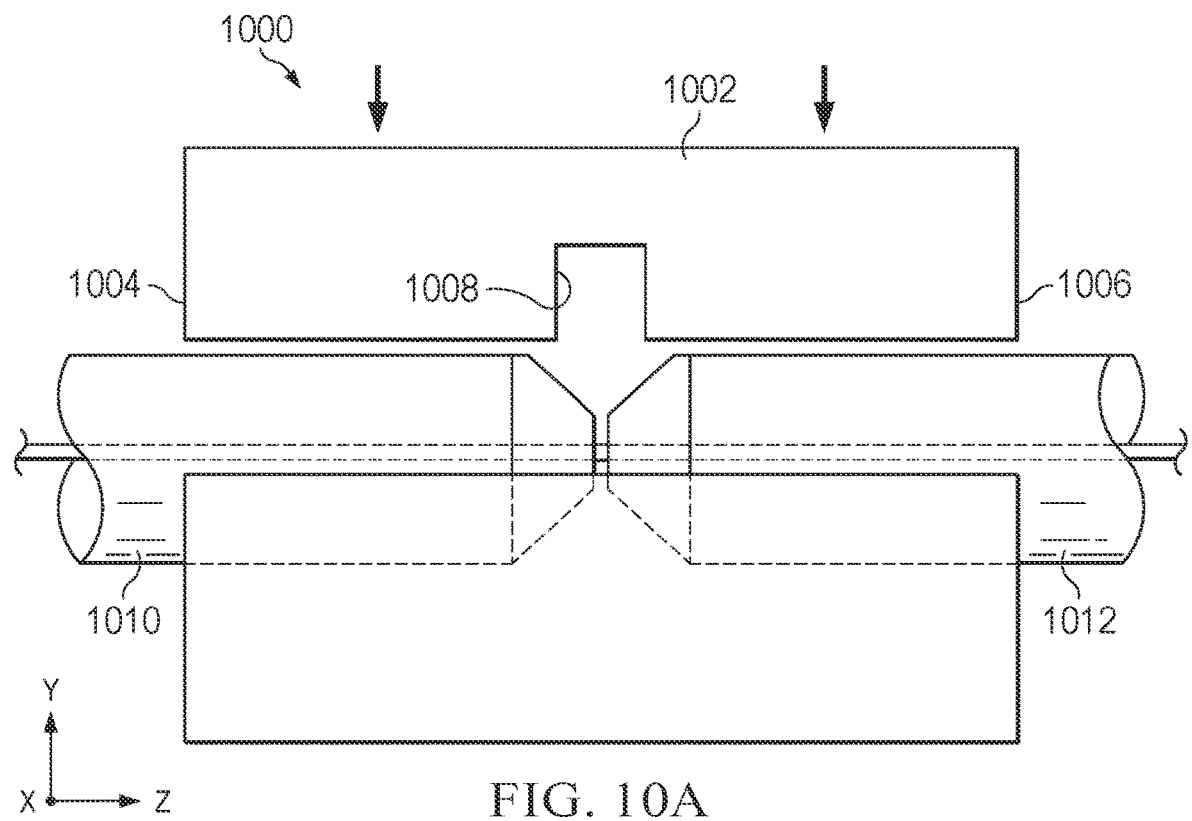
FIG. 10A illustrates an optical fiber alignment assembly with a unitary block clamping member, according to some examples.

FIGS. 10A-F illustrate alternative examples of clamping members. FIG. 10A illustrates an optical fiber alignment assembly 1000 with a unitary block clamping member 1002 that includes a clamping protrusion 1004 and a clamping protrusion 1006 separated by a channel 1008. The clamping protrusions 1004, 1006 may have substantially flat surfaces that engage flat surfaces on ferrules 1010, 1012. The ferrules 1010, 1012 may be substantially similar to the ferrules 904, 908, respectively. Similar to the example of FIGS. 9A-9B, when the clamping protrusions engage the flat surfaces of the ferrules, the ferrules may be constrained in at least four degrees of freedom (e.g., a translational DOF in the X-direction, a translational DOF in the Y-direction, a rotational DOF corresponding to pitch, a rotational DOF corresponding to yaw) and optionally in a rotational DOF corresponding to roll about the Z-direction longitudinal axis.

Figure 10B:
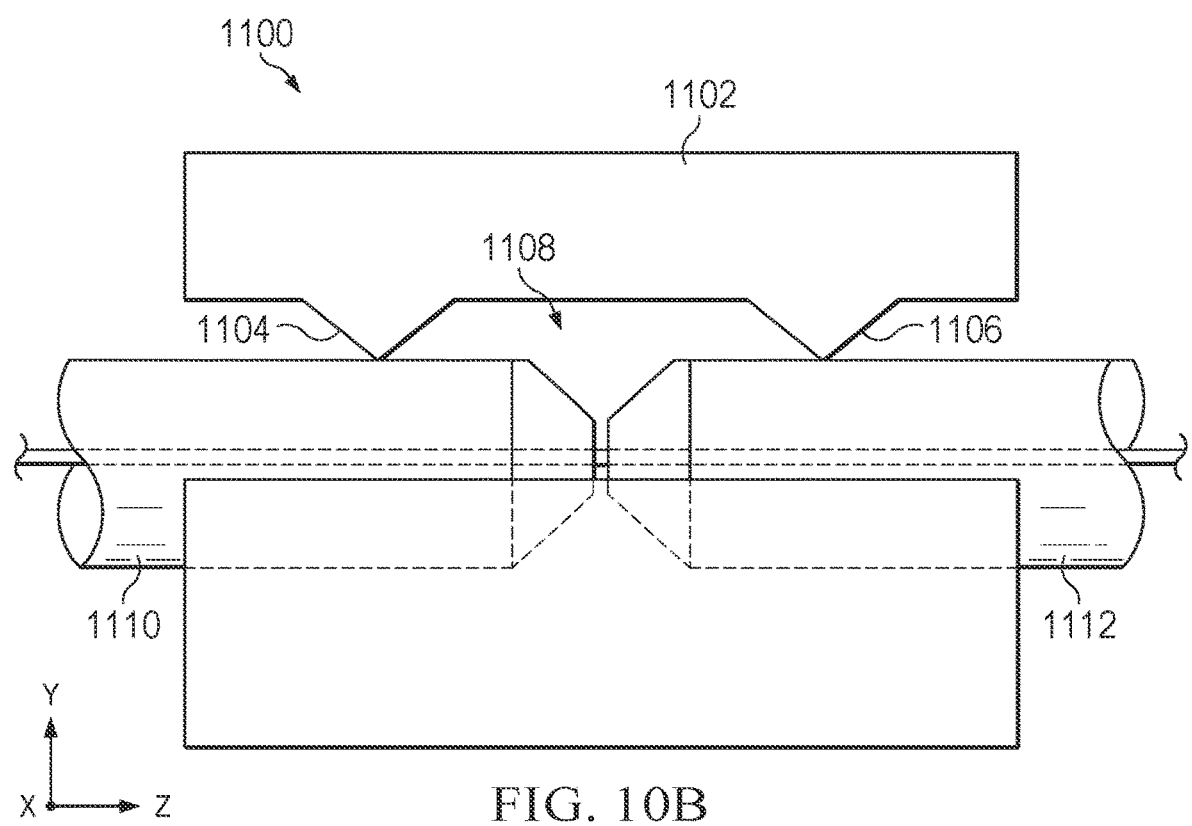
FIG. 10B illustrates an optical fiber alignment assembly with a clamping member including a pair of protrusions, according to some examples.

FIG. 10B illustrates an optical fiber alignment assembly 1100 with a unitary block clamping member 1102 that includes a tapered clamping protrusion 1104 and a tapered clamping protrusion 1106 separated by a channel 1108. The clamping protrusions 1104, 1106 may have substantially linear edges that engage flat surfaces on ferrules 1110, 1112. The ferrules 1110, 1112 may be substantially similar to the ferrules 904, 908, respectively. Similar to the example of FIGS. 9A-9B, when the clamping protrusions engage the flat surfaces of the ferrules, the ferrules may be constrained in at least four degrees of freedom (e.g., a translational DOF in the X-direction, a translational DOF in the Y-direction, a rotational DOF corresponding to pitch, a rotational DOF corresponding to yaw) and optionally in a rotational DOF corresponding to roll about the Z-direction longitudinal axis. However, because the clamping protrusion 1104 makes a generally linear contact with the ferrule 1110, and the clamping protrusion 1106 makes a generally linear contact with ferrule 1112, the clamping member 1102 provides a reduced contact area (as compared to clamping member 1002) that may prevent over-constraint of the ferrules 1110, 1112 and promote improved alignment.

Figure 10C:
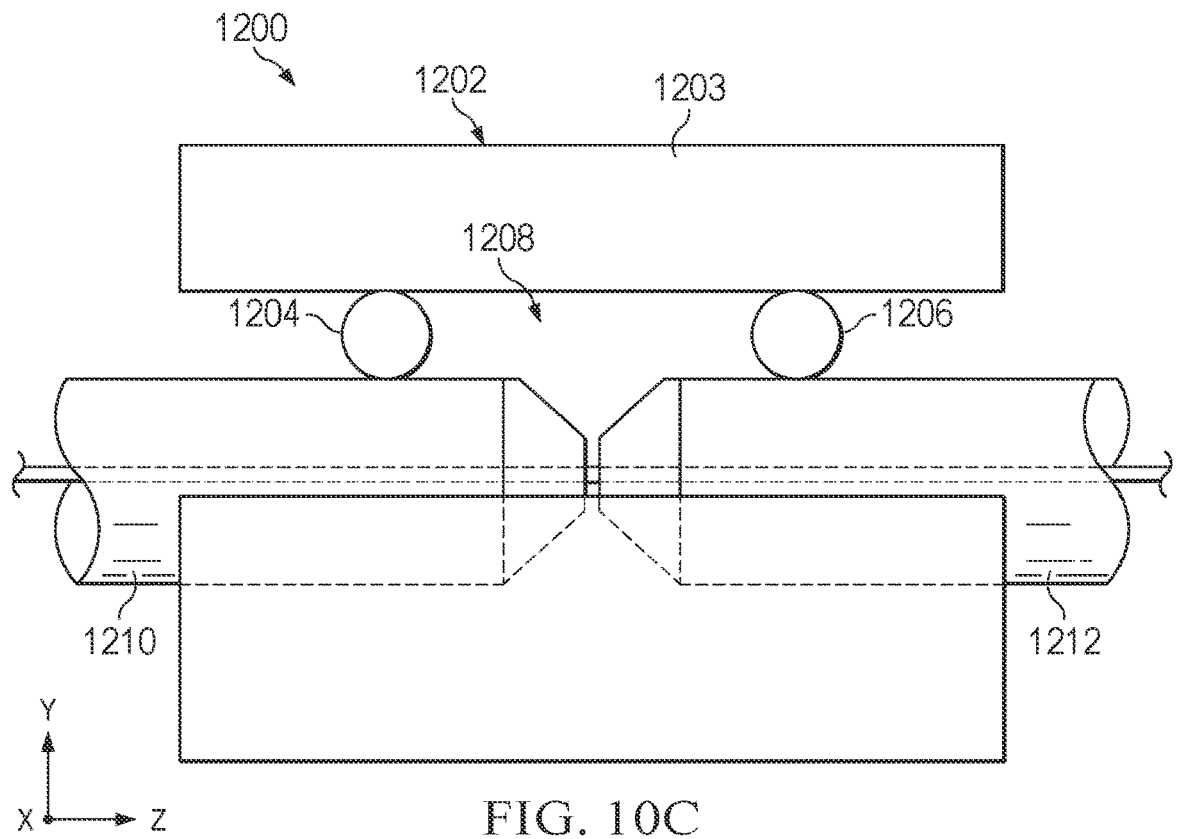
FIG. 10C illustrates an optical fiber alignment assembly with a clamping member including a pair of clamping rods, according to some examples.

FIG. 10C illustrates an optical fiber alignment assembly 1200 with a multi-part clamping member 1202 that includes a clamping member 1203 that exerts force on a clamping rod 1204 and a clamping rod 1206. The clamping rods 1204, 1206 may be separated by a channel 1208. The round clamping rods 1204, 1206 may make a substantially linear engagement with flat surfaces on ferrules 1210, 1212. The ferrules 1210, 1212 may be substantially similar to the ferrules 904, 908, respectively. Similar to the example of FIGS. 9A-9B, when the clamping protrusions engage the flat surfaces of the ferrules, the ferrules may be constrained in at least four degrees of freedom (e.g., a translational DOF in the X-direction, a translational DOF in the Y-direction, a rotational DOF corresponding to pitch, a rotational DOF corresponding to yaw) and optionally in a rotational DOF corresponding to roll about the Z-direction longitudinal axis. However, because the clamping rod 1204 makes a generally linear contact with the ferrule 1210, and the clamping rod 1206 makes a generally linear contact with ferrule 1212, the clamping member 1202 provides a reduced contact area (as compared to clamping member 1002) that may prevent over-constraint of the ferrules 1210, 1212 and promote improved alignment.

Figure 10D:
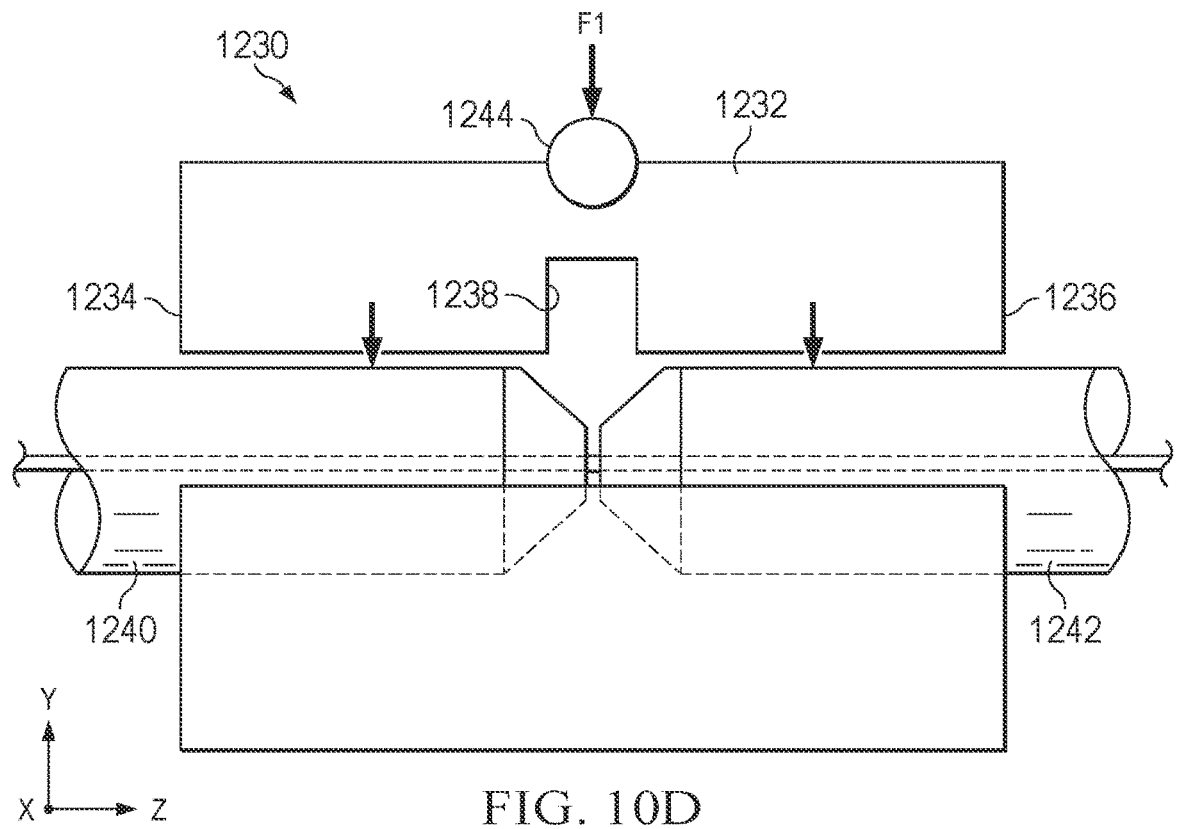
FIG. 10D-10F illustrate an optical fiber alignment assembly with clamping mechanisms that selectively apply a force.

FIG. 10D illustrates an optical fiber alignment assembly 1230 with a unitary block clamping member 1232 that includes a clamping mechanism 1234 and a clamping mechanism 1236 separated by a channel 1238. The clamping mechanisms 1234, 1236 may have substantially flat surfaces that engage flat surfaces on ferrules 1240, 1242. The ferrules 1240, 1242 may be substantially similar to the ferrules 904, 908, respectively. In some examples, the ferrules may have slightly different diameters, and consequently, the clamping mechanisms may engage the ferrules at slightly different heights (e.g., in the Y-dimension). The different engagement positions may be accomplished using a pivot device to allow the clamping member 1232 to tip. In this example, a clamping force F1 may be applied to a pivot device 1244 that tilts the clamping member 1232, allowing the mechanisms 1234, 1236 to each contact the respective ferrules 1240, 1242 if the ferrules have slightly different diameters. The pivot device 1244 may be centrally positioned on the clamping member 1232 and may be integrally formed, fixedly coupled, or movably coupled to the clamping member 1232. The clamping mechanism 1234 may thus be configured to selectively apply a force on the ferrule 1240 to constrain motion of the ferrule within the groove. The clamping mechanism 1236 may thus be configured to selectively apply a force on the ferrule 1242 to constrain motion of the ferrule within the groove. Similar to the example of FIGS. 9A-9B, when the clamping mechanisms engage the flat surfaces of the ferrules, the ferrules may be constrained in at least four degrees of freedom (e.g., a translational DOF in the X-direction, a translational DOF in the Y-direction, a rotational DOF corresponding to pitch, a rotational DOF corresponding to yaw) and optionally in a rotational DOF corresponding to roll about the Z-direction longitudinal axis.

Figure 10E:
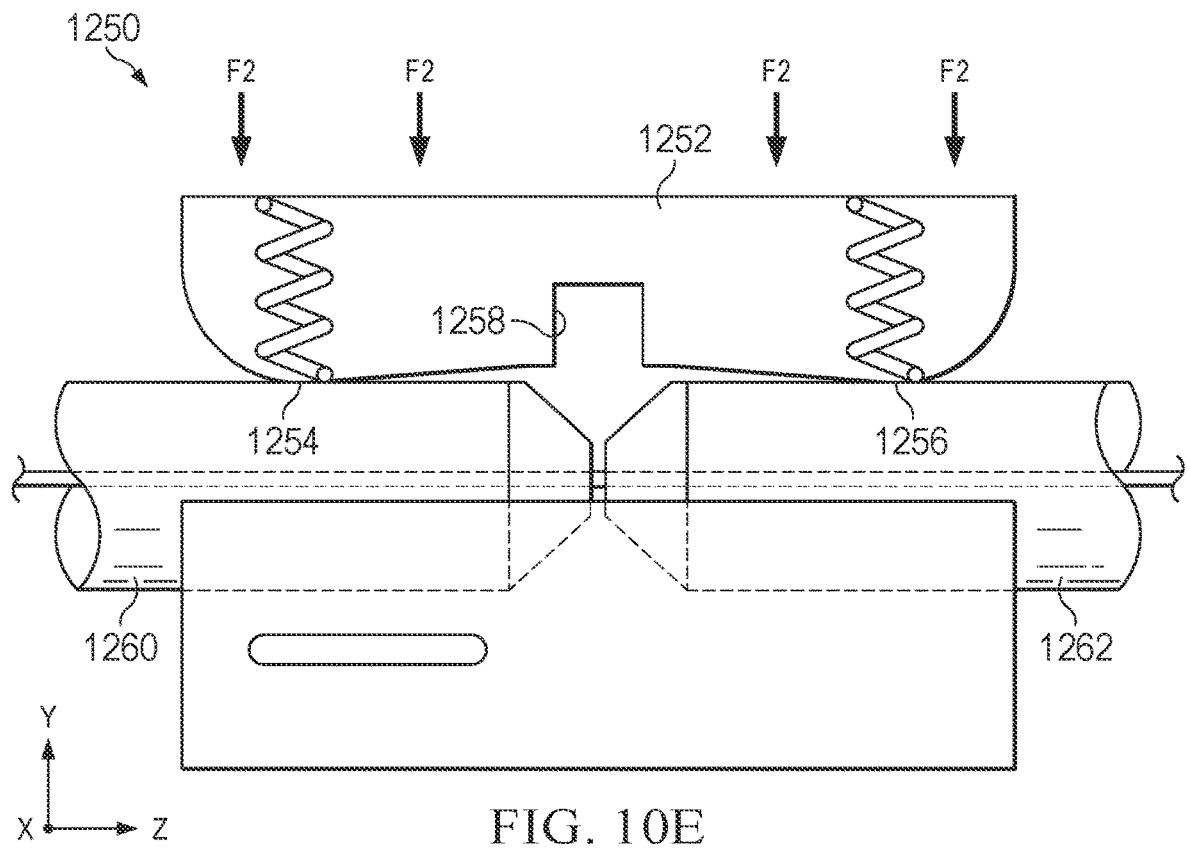

FIG. 10E illustrates an optical fiber alignment assembly 1250 with a unitary block clamping member 1252 that includes a clamping mechanism 1254 and a clamping mechanism 126 separated by a channel 1258. The ferrules 1260, 1262 may be substantially similar to the ferrules 904, 908, respectively. In some examples, the ferrules may have slightly different diameters, and consequently, the clamping mechanisms may engage the ferrules at slightly different heights (e.g., in the Y-dimension). The different engagement positions may be accomplished using flexible and/or elastic material to form the clamping member 1252. For example, each of the clamping mechanisms may include one or more springs and/or elastic or spring-like material. In this example, a clamping force F2 may be applied to the clamping member 1252. The flexible material of the clamping member 1252 may adjust in response to the force F2, allowing the mechanisms 1254, 1256 to each contact the respective ferrules 1260, 1262 if the ferrules have slightly different diameters. The clamping mechanism 1254 may thus be configured to selectively apply a force on the ferrule 1260 to constrain motion of the ferrule within the groove. The clamping mechanism 1256 may thus be configured to selectively apply a force on the ferrule 1262 to constrain motion of the ferrule within the groove. Similar to the example of FIGS. 9A-9B, when the clamping mechanisms engage the flat surfaces of the ferrules, the ferrules may be constrained in at least four degrees of freedom (e.g., a translational DOF in the X-direction, a translational DOF in the Y-direction, a rotational DOF corresponding to pitch, a rotational DOF corresponding to yaw) and optionally in a rotational DOF corresponding to roll about the Z-direction longitudinal axis.

Figure 10F:
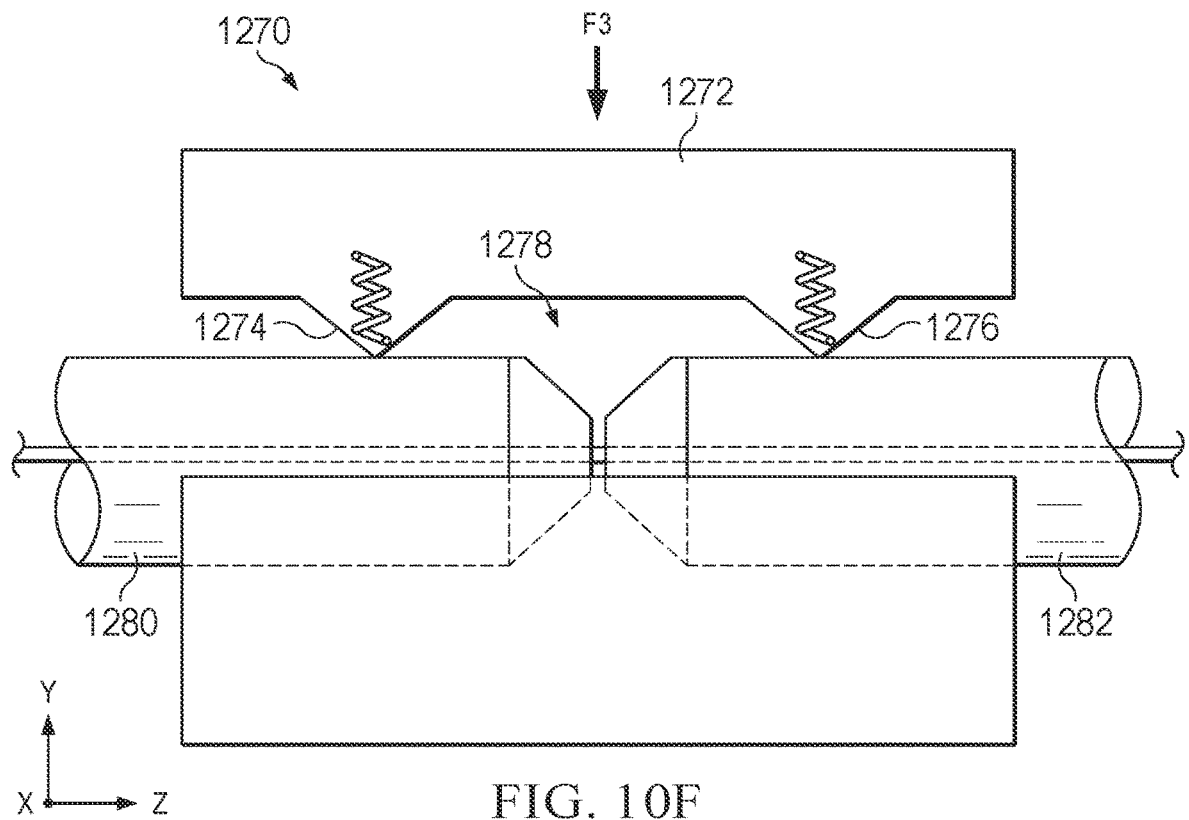

FIG. 10F illustrates an optical fiber alignment assembly 1270 with a unitary block clamping member 1272 that includes a tapered or localized-contact clamping mechanism 1274 and a tapered or localized-contact clamping mechanism 1276 separated by a channel 1278. The clamping mechanisms 1274, 1276 may include elastic material and/or springs that engage flat surfaces on ferrules 1280, 1282. The ferrules 1280, 1282 may be substantially similar to the ferrules 904, 908, respectively. In some examples, the ferrules may have slightly different diameters, and consequently, the clamping mechanisms may engage the ferrules at slightly different heights (e.g., in the Y-dimension). In this example, a clamping force F3 may be applied to the clamping member 1272 and the springs or elastic material of the mechanisms 1274, 1276 adjust, allowing the mechanisms to each contact the respective ferrules if the ferrules have slightly different diameters. The clamping mechanism 1274 may thus be configured to selectively apply a force on the ferrule 1280 to constrain motion of the ferrule within the groove. The clamping mechanism 1276 may thus be configured to selectively apply a force on the ferrule 1282 to constrain motion of the ferrule within the groove. Similar to the example of FIGS. 9A-9B, when the clamping mechanisms engage the flat surfaces of the ferrules, the ferrules may be constrained in at least four degrees of freedom (e.g., a translational DOF in the X-direction, a translational DOF in the Y-direction, a rotational DOF corresponding to pitch, a rotational DOF corresponding to yaw) and optionally in a rotational DOF corresponding to roll about the Z-direction longitudinal axis.

Figure 11A:
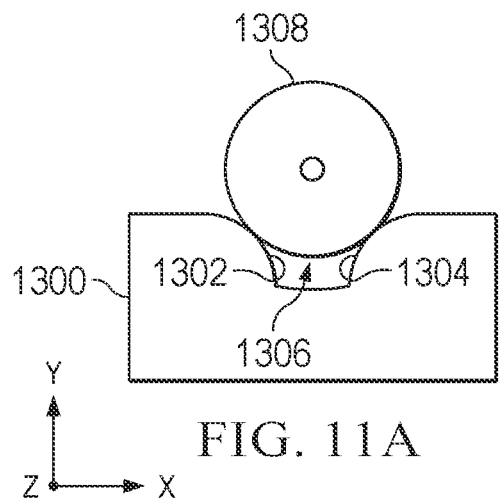
FIG. 11A illustrates an optical fiber alignment assembly with curved engagement surfaces, according to some examples.
Figure 11B:
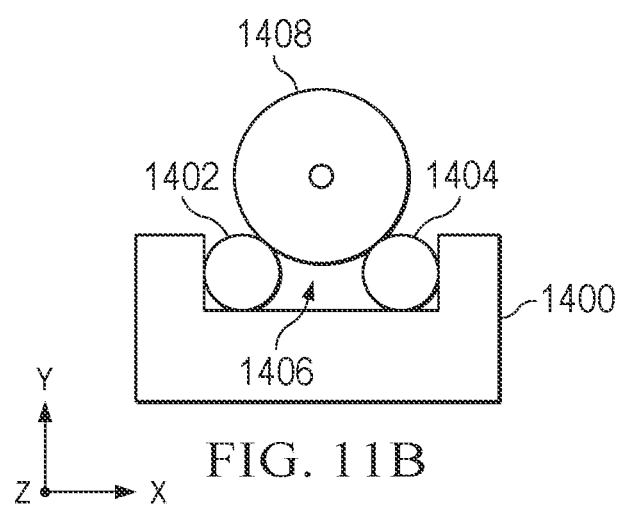
FIG. 11B illustrates an optical fiber alignment assembly with rods including engagement surfaces, according to some examples.

FIGS. 11A-B illustrate alternative examples of alignment fixtures that may be substantially similar to alignment fixture 102, with the differences as described. FIG. 11A illustrates alignment fixture 1300 that includes an alignment feature including a generally curved engagement surface 1302 and a generally curved engagement surface 1304 that are spaced apart to form a groove 1306. An optical fiber ferrule 1308 (e.g., substantially similar to a ferrule 116) may be received in the groove 1306 and held in place against the surfaces 1302, 1304 by a clamping assembly (e.g., clamping assembly 104). The optical fiber ferrule 1308 may be generally cylindrical such that when it is clamped, the ferrule 1308 may make a linear contact with the surface 1302 and a linear contact with the surface 1304. The clamped ferrule 1308 be constrained in at least four degrees of freedom, (e.g., a translational DOF in the X-direction, a translational DOF in the Y-direction, a rotational DOF corresponding to pitch, and a rotational DOF corresponding to yaw). With a mating ferrule similarly constrained, optical fibers of the two ferrules may be aligned with each other.

FIG. 11B illustrates alignment fixture 1400 that includes an alignment feature including a cylindrical rod 1402 and a cylindrical rod 1404 that are spaced apart to form a groove 1406. The rods 1402, 1404 may be generally parallel to each other. An optical fiber ferrule 1408 (e.g., substantially similar to a ferrule 116) may be received in the groove 1406 and held in place against the rods 1402, 1404 by a clamping assembly (e.g., clamping assembly 104). The optical fiber ferrule 1408 may be generally cylindrical such that when it is clamped, the ferrule 1408 may make a linear contact with the surface of rod 1402 and a linear contact with the surface of rod 1404. The clamped ferrule 1408 be constrained in at least four degrees of freedom, (e.g., a translational DOF in the X-direction, a translational DOF in the Y-direction, a rotational DOF corresponding to pitch, and a rotational DOF corresponding to yaw). With a mating ferrule similarly constrained, optical fibers of the two ferrules may be aligned with each other.

Figure 12A:
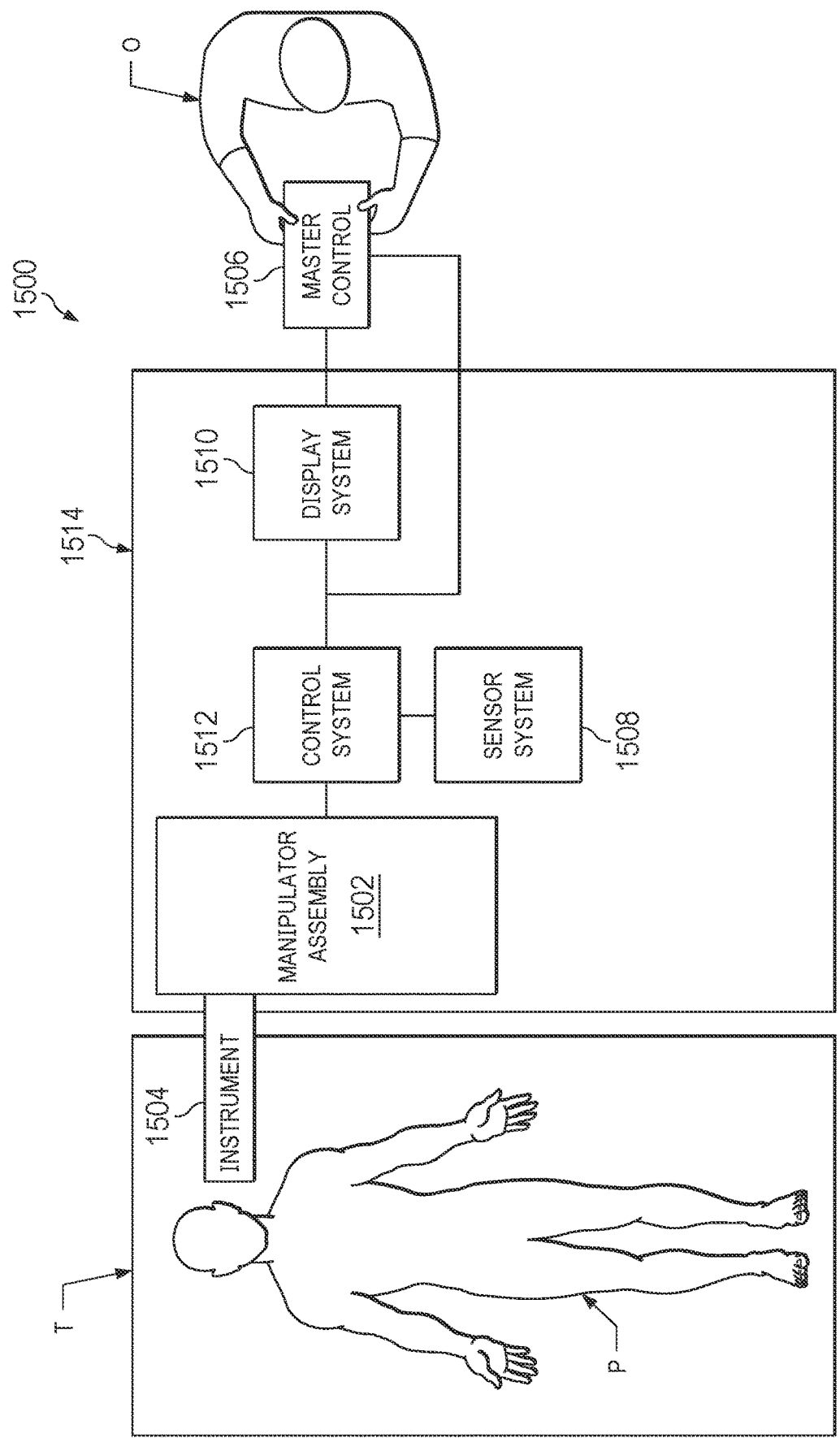
FIG. 12A is a simplified diagram of a medical system configured in accordance with some examples.
Figure 12B:
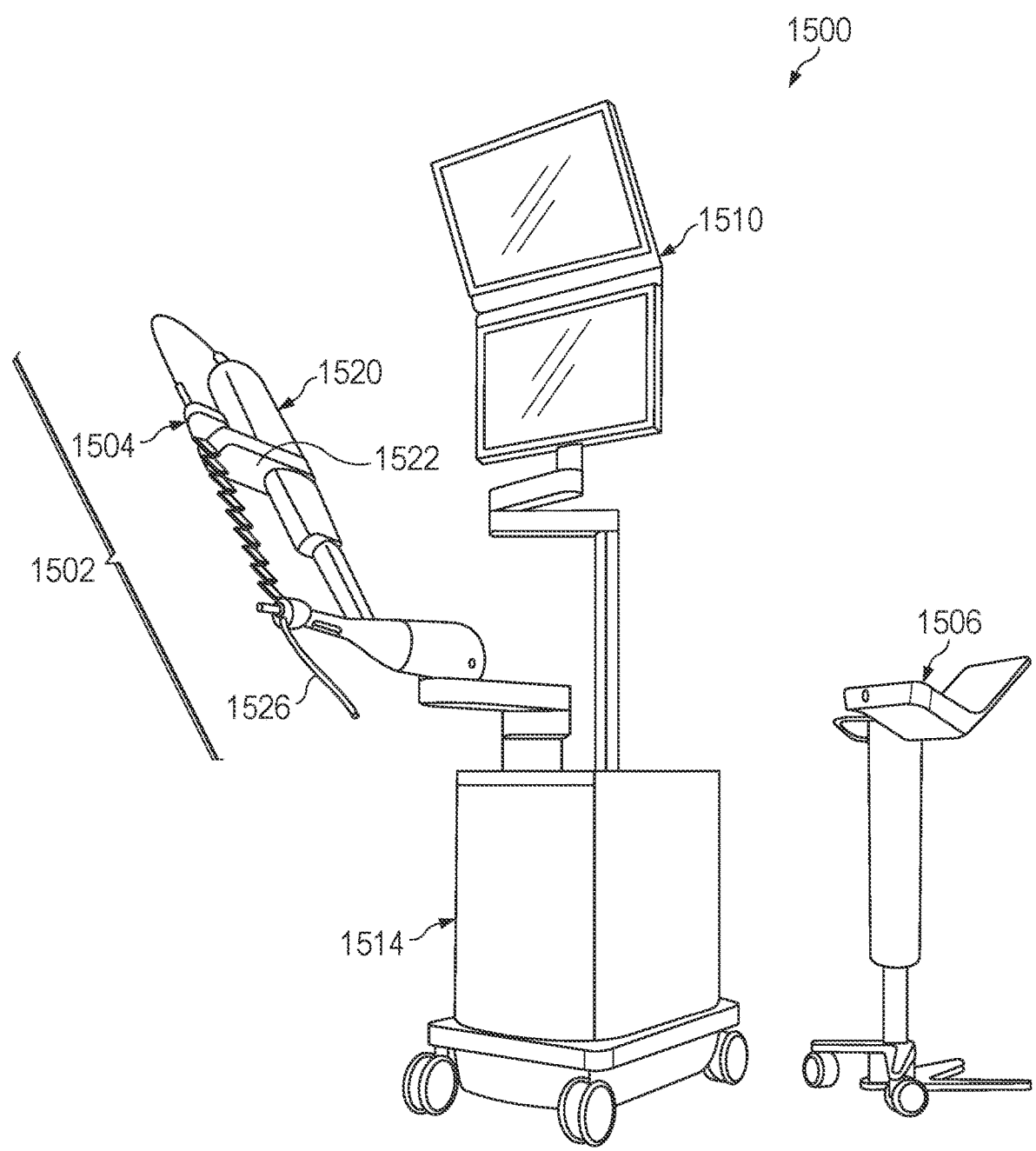
FIG. 12B is a perspective view of a structural representation of the medical system of FIG. 12A.

The optical fiber alignment assemblies described herein may be used to align, couple, and/or clean optical fibers within various systems, including a medical system. FIG. 12A is a simplified diagram of a medical system 1500 and FIG. 12B is a perspective view of the system 1500 configured in accordance with embodiments of the present technology. The system 1500 may be suitable for use in surgical, diagnostic, therapeutic, or biopsy procedures, among others. While some embodiments of the system 1500 are described herein with respect to such procedures, references to specific medical or surgical instruments and medical or surgical methods is not intended to limit the scope of the present technology. The systems, instruments, and methods described herein may be used for humans, animals, human cadavers, animal cadavers, portions of human or animal anatomy, and/or non-surgical diagnosis, as well as industrial systems and general robotic or teleoperational systems.

As shown in FIGS. 12A and 12B, the system 1500 generally includes a manipulator assembly 1502 having an instrument manipulator 1520 (see FIG. 12B) to manipulate a medical instrument 1504 while performing various procedures on a patient P. The optical fiber alignment assemblies described herein may be used to align, couple, and/or clean optical fibers in the instrument manipulator 1520 and the medical instrument 1504, as previously described. The manipulator assembly 1502 may be teleoperated, non-teleoperated, or a hybrid teleoperated and non-teleoperated assembly with select degrees of freedom of motion that may be motorized and/or teleoperated, and select degrees of freedom of motion that may be non-motorized and/or non-teleoperated. The manipulator assembly 1502 may be mounted to an operating table T, or to a main support 1514 (e.g., a movable cart, stand, second table, etc.). The system may include a master control 1506 configured to allow an operator O (e.g., a surgeon, clinician, physician, etc.) to view the interventional site and to control the manipulator assembly 1502.

The master control 1506 of the system 1500 may be located near or in the same room as the operating table T. In some embodiments, for example, the master control 1506 is positioned near the side of a surgical table T on which the patient P is located. However, it should be understood that the operator O can be located in a different room or any distance away from the patient P. The master control 1506 generally includes one or more input and control devices (not shown) for controlling the medical instrument 1504 via the instrument manipulator 1520. The input and control devices may include any number of a variety of input devices, such as joysticks, trackballs, data gloves, trigger-guns, hand-operated controllers, voice recognition devices, body motion or presence sensors, etc. The input and control devices may be provided with the same degrees of freedom as the associated medical instrument to take advantage of the familiarity of the operator O in directly controlling like instruments. In this regard, the control devices may provide operator O with telepresence or the perception that the control devices are integral with the medical instruments. However, the input and control devices may have more or fewer degrees of freedom than the associated medical instrument 1504 and still provide operator O with telepresence. In some embodiments, the control devices may optionally be manual input devices that move with six degrees of freedom, and which may also include an actuatable handle for actuating instruments (e.g., for closing grasping jaws, applying an electrical potential to an electrode, delivering a medicinal treatment, etc.).

The input and control devices of the master control 1506 may include a scroll wheel and a trackball. In an example implementation of the system 1500, the scroll wheel may be rolled forwards or backwards in order to control the advancement or retraction of the medical instrument 1504 with respect to the patient anatomy, and the trackball may be rolled in various directions by the operator O to steer the position of the distal end portion and/or distal tip of the medical instrument 1504, e.g., to control bend or articulation. Various systems and methods related to motion control consoles are described in PCT Pub. No. 2019/027922 (filed Jul. 30, 2018, titled "Systems and Methods for Safe Operation of a Device"), and U.S. Patent Pub. No. 2019/0029770 (filed Jul. 30, 2018, titled "Systems and Methods for Steerable Elongate Device"), which are incorporated by reference herein in their entireties.

As shown in FIG. 12B, the instrument manipulator 1520 may be configured to support and manipulate the medical instrument 1504 with a kinematic structure of one or more non-servo-controlled links (e.g., one or more links that may be manually positioned and locked in place, generally referred to as a set-up structure (SUS)), and/or one or more servo-controlled links (e.g., one or more powered links that may be controlled in response to commands). The instrument manipulator 1520 may include a plurality of actuators or motors that drive inputs on the medical instrument 1504 in response to commands from a control system 1512. The actuators may include drive systems that when coupled to the medical instrument 1504 may advance the medical instrument 1504 into a naturally or surgically created anatomic orifice in the patient P. In some embodiments, the kinematic structure may be locked in place or unlocked to be manually manipulated by the operator O interacting with switches, buttons, or other types of input devices.

The instrument manipulator 1520 may be configured to position the medical instrument 1504 at an optimal position and orientation relative to patient anatomy or other medical devices. In this regard, drive systems may be included in the instrument manipulator 1520 to move the distal end of the medical instrument 1504 according to any intended degree of freedom, which may include three degrees of linear motion (e.g., linear motion along the X, Y, and/or Z Cartesian axes) and three degrees of rotational motion (e.g., rotation about the X, Y, and Z Cartesian axes). Additionally, the actuators can be used to actuate an articulable end effector (not shown) of the medical instrument 1504 for grasping tissue in the jaws of a biopsy device or the like. Actuator position sensors, such as resolvers, encoders, potentiometers, and other mechanisms, may provide sensor data to the system 1500 describing the rotation and orientation of the motor shafts of the instrument manipulator 1520. Such position sensor data may be used to determine motion of the objects manipulated by the actuators.

In some embodiments, the optimal location and orientation can include alignment of the manipulator assembly 1502 with respect to anatomy of the patient P, for example, to minimize friction of the medical instrument 1504 positioned within the anatomy of the patient P (e.g., in anatomical openings, patient vasculature, patient endoluminal passageways, etc.), or within medical devices coupled to patient anatomy (e.g., cannulas, trocars, endotracheal tubes (ETT), laryngeal esophageal masks (LMA), etc.). Optimal location and orientation of the manipulator assembly 1502 can additionally or alternatively include optimizing the ergonomics for the operator O by providing sufficient workspace and/or ergonomic access to the medical instrument 1504 when utilizing various medical tools such as needles, graspers, scalpels, grippers, ablation probes, visualization probes, etc. with the medical instrument 1504.

Each adjustment of the manipulator assembly 1502 (e.g., insertion, rotation, translation, etc.) can be actuated by either robotic control or by manual intervention by the operator O. For example, each rotational or linear adjustment may be maintained in a stationary configuration using brakes. In this regard, depression of one or more buttons and switches releases one or more corresponding brakes, allowing the operator O to manually position the medical instrument 1504 through positioning of the instrument manipulator 1520. One or more adjustments may also be controlled by one or more actuators (e.g., motors) such that an operator may use a button or switch to actuate a motor to alter the manipulator assembly 1502 in a desired manner to position the manipulator assembly 1502 in the optimal position and orientation. In some embodiments, robotic control of the manipulator assembly 1502 can be actuated by activating a button or switch. In one example, one position of the button or switch may initiate powered rotation of the manipulator assembly 1502 in a first direction of rotation and another position of the button or switch may initiate powered rotation of the manipulator assembly 1502 in the other direction.

The manipulator assembly 1502 may be configured such that when a button or switch is activated, the operator O may adjust the instrument manipulator 1520 along a linear path that corresponds to inserting or retracting the medical instrument 1504. For safety purposes, the manipulator assembly 1502 might only be manually movable in one translation direction, such as retraction, and might not be manually movable in the direction of insertion of the medical instrument 1504, to prevent the operator O from inadvertently or undesirably advancing the medical instrument into the anatomy of the patient O.

As shown in FIG. 12A, the system 1500 may include a sensor system 1508 with one or more sub-systems for receiving information about the instruments coupled to the instrument manipulator 1520. Such sub-systems may include a position/location sensor system (e.g., an electromagnetic (EM) sensor system); a shape sensor system (e.g., an optical fiber shape sensor) for determining the position, orientation, speed, velocity, pose, and/or shape of a distal end, and/or of one or more segments along a flexible body that may make up a portion of the medical instrument 1504; and/or a visualization system for capturing images from the distal portion of the medical instrument 1504, among other possible sensors.

Referring again to FIGS. 12A and 12B together, the system 1500 also may include a display system 1510 for displaying an image or representation of the surgical site and the medical instrument 1504 generated the sensor system 1508, recorded pre-operatively or intra-operatively. The display system 1510 may use image data from imaging technology and/or a real time image, such as by computed tomography (CT), magnetic resonance imaging (MRI), fluoroscopy, thermography, ultrasound, optical coherence tomography (OCT), thermal imaging, impedance imaging, laser imaging, nanotube X-ray imaging, endoscopic images, and the like, or combinations thereof. The pre-operative or intra-operative image data may be presented as two-dimensional, three-dimensional, or four-dimensional (including e.g., time based or velocity-based information) images and/or as images from models created from the pre-operative or intra-operative image data sets. The display system 1510 and the master control 1506 may be oriented such that the operator O can control the medical instrument 1504 and the master control 1506 with the perception of telepresence.

The display of visual indicators, markers, and or images on the display system 1510 may be altered by input devices (e.g., buttons, switches, etc.) on the manipulator assembly 1502 and/or the master control 1506. For example, actuating button or switch can cause a marker to be placed in a rendered model of patient anatomy displayed on the display system 1510. The marker could correspond to an area within the patient at which a procedure (e.g., biopsy) has been performed, or otherwise indicate an actual location within the patient anatomy where the medical instrument has been positioned. Such a virtual navigational marker may be dynamically referenced with registered preoperative or concurrent images or models. Systems and methods for registration are provided in PCT Pub. No. WO 2016/191298 (published Dec. 1, 2016, titled "Systems and Methods of Registration for Image Guided Surgery"), and in U.S. Pat. No. 8,900,131 (filed May 13, 2011, titled "Medical System Providing Dynamic Registration of a Model of an Anatomic Structure for Image-Guided Surgery"), which are incorporated by reference herein in their entireties.

The control system 1512 may include at least one memory and at least one computer processor (not shown) for effecting control between the medical instrument 1504, the master control 1506, the sensor system 1508, and the display system 1510. The control system 1512 may also include programmed instructions, which may be stored on a non-transitory machine-readable medium, to implement some or all of the methods described in accordance with aspects of the present technology disclosed herein, including instructions for providing information to the display system 1510. The control system 1512 may include two or more data processing circuits with one portion of the processing optionally being performed on or adjacent to the manipulator assembly 1502, another portion of the processing being performed at the master control 1506, etc. The processors of the control system 1512 may execute instructions for the processes disclosed herein. Any of a wide variety of centralized or distributed data processing architectures may be employed. Similarly, the programmed instructions may be implemented as a number of separate programs or subroutines, or they may be integrated into a number of other aspects of the teleoperational systems described herein. In one embodiment, the control system 2112 supports wireless communication protocols, such as Bluetooth, IrDA, HomeRF, IEEE 802.11, DECT, Wireless Telemetry, and the like.

The control system 1512 may receive force and/or torque feedback from the medical instrument 1504. In response, the control system 1512 may transmit signals to the master control 2106. In some embodiments, the control system 1512 may transmit signals instructing one or more actuators of the manipulator assembly 1502 to move the medical instrument 1504. The medical instrument 1504 may extend into an internal surgical site within the body of patient P via openings in the body of patient P. Any suitable conventional and/or specialized actuators may be used with the manipulator assembly 1502. The one or more actuators may be separate from, or integrated with, the manipulator assembly 1502. In some embodiments, the one or more actuators and the manipulator assembly 1502 are provided as part of the main support 1514, which can be positioned adjacent to the patient P and the operating table T. In some embodiments, the manipulator assembly 1502, control system 1512, sensor system 1508, and display system 1510 may be supported by the main support 1514, or some or all of these components may be integrated into the main support 1514. Alternatively, one or more of these components may be mounted to the operating table T or integrated into the master control 1506.

The control system 1512 may further include a virtual visualization system to provide navigation assistance to the operator O when controlling the medical instrument 1504 during an image-guided surgical procedure. Virtual navigation using the virtual visualization system may be based upon reference to an acquired preoperative or intraoperative dataset of anatomic passageways. During a virtual navigation procedure, the sensor system 1508 may be used to compute an approximate location of the medical instrument 1504 with respect to the anatomy of the patient P. The location can be used to produce both macro-level tracking images (external to the anatomy of patient P) and virtual images (internal to the anatomy of patient P). The control system 1512 may implement one or more EM sensor, fiber optic sensors, and/or other sensors to register and display a medical implement together with preoperatively recorded surgical images, such as those from a virtual visualization system. For example, PCT Pub. No. WO 2016/191298 (published Dec. 1, 2016, titled "Systems and Methods of Registration for Image Guided Surgery"), which is incorporated by reference herein in its entirety, discloses one such system. Various systems and methods for monitoring the shape and relative position of an optical fiber in three dimensions are described in U.S. Pat. No. 7,781,724 (filed Sep. 26, 2006, titled "Fiber Optic Position and Shape Sensing Device and Method Relating Thereto"); U.S. Pat. No. 7,772,541 (filed on Mar. 12, 2008, titled "Fiber Optic Position and/or Shape Sensing Based on Rayleigh Scatter"); and U.S. Pat. No. 6,389,187 (filed on Jun. 17, 1998, titled "Optical Fiber Bend Sensor"), which are all incorporated by reference herein in their entireties.

The system 1500 may further include optional operations and support systems (not shown) such as illumination systems, steering control systems, irrigation systems, and/or suction systems. In some embodiments, the system 1500 may include more than one manipulator assembly and/or more than one master control. The exact number of teleoperational manipulator assemblies can be tailored for the surgical procedure to be performed and/or the space constraints within the operating room, among other factors. Multiple master controls may be collocated or positioned in separate locations. Multiple master controls allow more than one operator to control one or more teleoperational manipulator assemblies in various combinations.

The instrument manipulator 1520 can be configured to support and position an elongate device 1526 of the medical instrument 1504. Various elongate devices are described in PCT Pub. No. WO 2019/018736 (filed Jul. 20, 2018, titled "Flexible Elongate Device Systems and Methods"), which is incorporated by reference herein in its entirety.

The system 1500 may be configured to allow positioning of the display system 1510 and main support 1514 at a desired location relative to the operating table T and the patient P. Various systems and methods relating to a display system and a main support are described in PCT Pub. No. WO 2018/132386 (filed Jan. 9, 2018, titled "Systems and Methods for Using a Robotic Medical System"), which is incorporated by reference herein in its entirety. The main support 1514 may include hardware (e.g., processor(s), firmware, etc.) and/or or software to perform functions for performing shape-sensing with respect to a flexible elongate device.

In the description, specific details have been set forth describing some embodiments. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure.

Elements described in detail with reference to one embodiment, implementation, or application optionally may be included, whenever practical, in other embodiments, implementations, or applications in which they are not specifically shown or described. For example, if an element is described in detail with reference to one embodiment and is not described with reference to a second embodiment, the element may nevertheless be claimed as included in the second embodiment. Thus, to avoid unnecessary repetition in the following description, one or more elements shown and described in association with one embodiment, implementation, or application may be incorporated into other embodiments, implementations, or aspects unless specifically described otherwise, unless the one or more elements would make an embodiment or implementation non-functional, or unless two or more of the elements provide conflicting functions. Not all the illustrated processes may be performed in all embodiments of the disclosed methods. Additionally, one or more processes that are not expressly illustrated in may be included before, after, in between, or as part of the illustrated processes. In some embodiments, one or more of the processes may be performed by a control system or may be implemented, at least in part, in the form of executable code stored on non-transitory, tangible, machine-readable media that when run by one or more processors may cause the one or more processors to perform one or more of the processes.

Any alterations and further modifications to the described devices, instruments, methods, and any further application of the principles of the present disclosure are fully contemplated as would normally occur to one skilled in the art to which the disclosure relates. In addition, dimensions provided herein are for specific examples and it is contemplated that different sizes, dimensions, and/or ratios may be utilized to implement the concepts of the present disclosure. To avoid needless descriptive repetition, one or more components or actions described in accordance with one illustrative embodiment can be used or omitted as applicable from other illustrative embodiments. For the sake of brevity, the numerous iterations of these combinations will not be described separately. For simplicity, in some instances the same reference numbers are used throughout the drawings to refer to the same or like parts.

The systems and methods described herein may be suited for imaging, via natural or surgically created connected passageways, in any of a variety of anatomic systems, including the lung, colon, the intestines, the stomach, the liver, the kidneys and kidney calices, the brain, the heart, the circulatory system including vasculature, and/or the like. While some embodiments are provided herein with respect to medical procedures, any reference to medical or surgical instruments and medical or surgical methods is non-limiting. For example, the instruments, systems, and methods described herein may be used for non-medical purposes including industrial uses, general robotic uses, and sensing or manipulating non-tissue work pieces. Other example applications involve cosmetic improvements, imaging of human or animal anatomy, gathering data from human or animal anatomy, and training medical or non-medical personnel. Additional example applications include use for procedures on tissue removed from human or animal anatomies (without return to a human or animal anatomy) and performing procedures on human or animal cadavers. Further, these techniques can also be used for surgical and nonsurgical medical treatment or diagnosis procedures.

One or more elements in embodiments of this disclosure may be implemented in software to execute on a processor of a computer system such as control processing system. When implemented in software, the elements of the embodiments of this disclosure may be code segments to perform various tasks. The program or code segments can be stored in a processor readable storage medium or device that may have been downloaded by way of a computer data signal embodied in a carrier wave over a transmission medium or a communication link. The processor readable storage device may include any medium that can store information including an optical medium, semiconductor medium, and/or magnetic medium. Processor readable storage device examples include an electronic circuit; a semiconductor device, a semiconductor memory device, a read only memory (ROM), a flash memory, an erasable programmable read only memory (EPROM); a floppy diskette, a CD-ROM, an optical disk, a hard disk, or other storage device. The code segments may be downloaded via computer networks such as the Internet, Intranet, etc. Any of a wide variety of centralized or distributed data processing architectures may be employed. Programmed instructions may be implemented as a number of separate programs or subroutines, or they may be integrated into a number of other aspects of the systems described herein. In some examples, the control system may support wireless communication protocols such as Bluetooth, Infrared Data Association (IrDA), HomeRF, IEEE 802.11, Digital Enhanced Cordless Telecommunications (DECT), ultra-wideband (UWB), ZigBee, and Wireless Telemetry.

Note that the processes and displays presented might not inherently be related to any particular computer or other apparatus. Various general-purpose systems may be used with programs in accordance with the teachings herein, or it may prove convenient to construct a more specialized apparatus to perform the operations described. The required structure for a variety of these systems will appear as elements in the claims. In addition, the embodiments of the invention are not described with reference to any particular programming language. It will be appreciated that a variety of programming languages may be used to implement the teachings of the invention as described herein.

This disclosure describes various instruments, portions of instruments, and anatomic structures in terms of their state in three-dimensional space. As used herein, the term position refers to the location of an object or a portion of an object in a three-dimensional space (e.g., three degrees of translational freedom along Cartesian x-, y-, and z-coordinates). As used herein, the term orientation refers to the rotational placement of an object or a portion of an object (e.g., in one or more degrees of rotational freedom such as roll, pitch, and/or yaw). As used herein, the term pose refers to the position of an object or a portion of an object in at least one degree of translational freedom and to the orientation of that object or portion of the object in at least one degree of rotational freedom (e.g., up to six total degrees of freedom). As used herein, the term shape refers to a set of poses, positions, or orientations measured along an object.

While certain illustrative embodiments of the invention have been described and shown in the accompanying drawings, it is to be understood that such embodiments are merely illustrative of and not restrictive on the broad invention, and that the embodiments of the invention not be limited to the specific constructions and arrangements shown and described, since various other modifications may occur to those ordinarily skilled in the art.

What is claimed is:

1. An optical fiber alignment assembly, comprising:
   an alignment fixture including a groove configured to engage first and second optical fiber ferrules;
   a first clamping mechanism configured to selectively apply a force on the first optical fiber ferrule to constrain motion of the first optical fiber ferrule within the groove;
   a second clamping mechanism configured to selectively apply a force on the second optical fiber ferrule to constrain motion of the second optical fiber ferrule within the groove; and
   a cleaning assembly including a cleaning media configured to pass between the first and second optical fiber ferrules, wherein the cleaning media is movable between a first position and a second position, wherein in the first position the cleaning media is positioned between the first and second optical fiber ferrules, and wherein in the second position the cleaning media is positioned between the first and second clamping mechanisms.

2. The optical fiber alignment assembly of claim 1, wherein the alignment fixture and the first and second clamping mechanisms are configured to constrain motion of the first and second optical fiber ferrules in at least four degrees of freedom.

3. The optical fiber alignment assembly of claim 1 wherein:
   the groove includes first and second surfaces; and
   each of the first and second surfaces engages the first optical fiber ferrule and the second optical fiber ferrule.

4. The optical fiber alignment assembly of claim 3, wherein the first and second surfaces are planar and the groove is a v-shaped groove formed by the first and second surfaces.

5. The optical fiber alignment assembly of claim 4, wherein:
   the first optical fiber ferrule includes a third surface that engages the first surface and a fourth surface that engages the second surface; and
   the third and fourth surfaces are planar surfaces that form a v-shaped protrusion, the v-shaped protrusion forming an angle that is greater than an angle formed by the v-shaped groove.

6. The optical fiber alignment assembly of claim 3 wherein the first and second surfaces are curved surfaces.

7. The optical fiber alignment assembly of claim 3 wherein:
   the alignment fixture includes a first rod and a second rod that forms the groove;
   the first surface is on the first rod; and
   the second surface is on the second rod.

8. The optical fiber alignment assembly of claim 1 wherein:
   the first clamping mechanism includes a first flat surface configured to engage a second flat surface of the first optical fiber ferrule to constrain a roll motion of the first optical fiber ferrule; and
   the second clamping mechanism includes a third flat surface configured to engage a fourth flat surface of the second optical fiber ferrule to constrain a roll motion of the second optical fiber ferrule.

9. The optical fiber alignment assembly of claim 1 wherein:
   the first clamping mechanism includes a first flat surface configured to engage a second flat surface of a flange coupled to the first optical fiber ferrule to constrain a roll motion of the first optical fiber ferrule; and
   the second clamping mechanism includes a third flat surface configured to engage a fourth flat surface of a flange coupled to the second optical fiber ferrule to constrain a roll motion of the second optical fiber ferrule.

10. The optical fiber alignment assembly of claim 1 wherein the cleaning media includes a cleaning ribbon.

11. The optical fiber alignment assembly of claim 10, wherein the first and second clamping mechanisms are spaced apart and the cleaning ribbon passes between the first and second clamping mechanisms.

12. The optical fiber alignment assembly of claim 10 wherein the cleaning assembly includes a first spool and a second spool, and the cleaning ribbon extends from the first spool to the second spool.

13. The optical fiber alignment assembly of claim 1 wherein the cleaning media includes at least one aperture.

14. The optical fiber alignment assembly of claim 1 wherein the cleaning assembly includes an actuator configured to move the cleaning media between the first and second optical fiber ferrules.

15. The optical fiber alignment assembly of claim 1 wherein the cleaning assembly includes a fluid reservoir.

16. The optical fiber alignment assembly of claim 1, further comprising an electrical ferrule motion mechanism configured to move at least one of the first or second optical fiber ferrules axially along the groove of the alignment fixture.

17. The optical fiber alignment assembly of claim 16, wherein the electrical ferrule motion mechanism includes a spring that provides an axial force.

18. The optical fiber alignment assembly of claim 1, further comprising a cover that extends across a portion of the alignment fixture.

19. The optical fiber alignment assembly of claim 1, wherein the groove includes first and second surfaces and wherein each of the first and second surfaces engage each of the first and second optical fiber ferrules with linear contact.

20. A medical system, comprising:
   a medical instrument in which a first optical fiber extends, wherein a first ferrule is coupled to an end of the first optical fiber;
   an instrument manipulator in which a second optical fiber extends, wherein a second ferrule is coupled to an end of the second optical fiber; and
   an optical fiber alignment assembly including:
      an alignment fixture including a groove configured to engage the first and second ferrules;
      a first clamping mechanism configured to selectively apply a force on the first ferrule to constrain motion of the first ferrule within the groove;
      a second clamping mechanism configured to selectively apply a force on the second ferrule to constrain motion of the second ferrule within the groove; and
      a cleaning assembly including a cleaning media configured to pass between the first and second ferrules, wherein the cleaning media is movable between a first position and a second position, wherein in the first position the cleaning media is positioned between the first and second ferrules, and wherein in the second position the cleaning media is positioned between the first and second clamping mechanisms.

21. The medical system of claim 20 wherein the alignment fixture and the second clamping mechanism are housed in the instrument manipulator.

22. The medical system of claim 20 wherein the alignment fixture and the first clamping mechanism are housed in the medical instrument.

23. The medical system of claim 20, further comprising an adapter positionable between the medical instrument and the instrument manipulator, and wherein the optical fiber alignment assembly is housed in the adapter.

24. An optical fiber alignment assembly, comprising:
- an alignment fixture including a groove configured to engage first and second optical fiber ferrules;
- a first clamping mechanism configured to selectively apply a force on the first optical fiber ferrule to constrain motion of the first optical fiber ferrule within the groove;
- a second clamping mechanism configured to selectively apply a force on the second optical fiber ferrule to constrain motion of the second optical fiber ferrule within the groove; and
- a cleaning assembly including a cleaning media configured to pass between the first and second optical fiber ferrules, wherein the cleaning media includes at least one aperture.

25. The optical fiber alignment assembly of claim 24 wherein the cleaning assembly includes an actuator configured to move the cleaning media between the first and second optical fiber ferrules.

\* \* \* \* \*